(12) United States Patent
Ito et al.

(10) Patent No.: US 6,968,906 B2
(45) Date of Patent: Nov. 29, 2005

(54) ELECTRIC TILLING MACHINE

(75) Inventors: Jun Ito, Wako (JP); Joji Maeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/787,727

(22) Filed: Feb. 26, 2004

(65) Prior Publication Data

US 2004/0182585 A1    Sep. 23, 2004

(30) Foreign Application Priority Data

Mar. 17, 2003    (JP) .............................. 2003-072549

(51) Int. Cl.⁷ .......................... A01B 33/08; B62D 51/06
(52) U.S. Cl. .......................... 172/41; 172/42; 172/123; 172/776; 15/1; 15/247; 49/1
(58) Field of Search .............................. 172/35, 41, 42, 172/81, 118, 119, 121–123, 125, 776, 508–517; 15/247, 257.1, 1, 383, 56, 3; 49/1

(56) References Cited

U.S. PATENT DOCUMENTS

| | | | |
|---|---|---|---|
| 4,452,185 A | * | 6/1984 | Larsen et al. ............ 123/41.58 |
| 4,469,184 A | * | 9/1984 | Simpson ...................... 172/41 |
| 4,667,745 A | * | 5/1987 | Hasler .......................... 172/42 |
| 5,709,295 A | * | 1/1998 | Johnson ...................... 194/350 |
| 5,896,931 A | * | 4/1999 | Roberts et al. ............... 172/42 |
| 6,397,791 B1 | * | 6/2002 | Brister .................... 123/41.15 |

FOREIGN PATENT DOCUMENTS

JP    58124378    8/1983

* cited by examiner

Primary Examiner—Christopher J. Novosad
(74) Attorney, Agent, or Firm—Adams & Wilks

(57) ABSTRACT

An electric tilling machine has a motor mounted on a machine body for rotationally driving a tilling shaft provided with tilling claws. A housing/cleaning box has an upper opening and is configured to receive therein the tilling shaft and tilling claws with the machine body closing the opening of the box. Front and rear locking sections lock the machine body to the housing/cleaning box with the tilling shaft and tilling claws housed in the box. A control section keeps the motor in a controllably operable condition while the machine body is locked in the housing/cleaning box so that the motor can be operated to rotate the tilling shaft and tilling claws within the box in a cleaning mode.

5 Claims, 19 Drawing Sheets

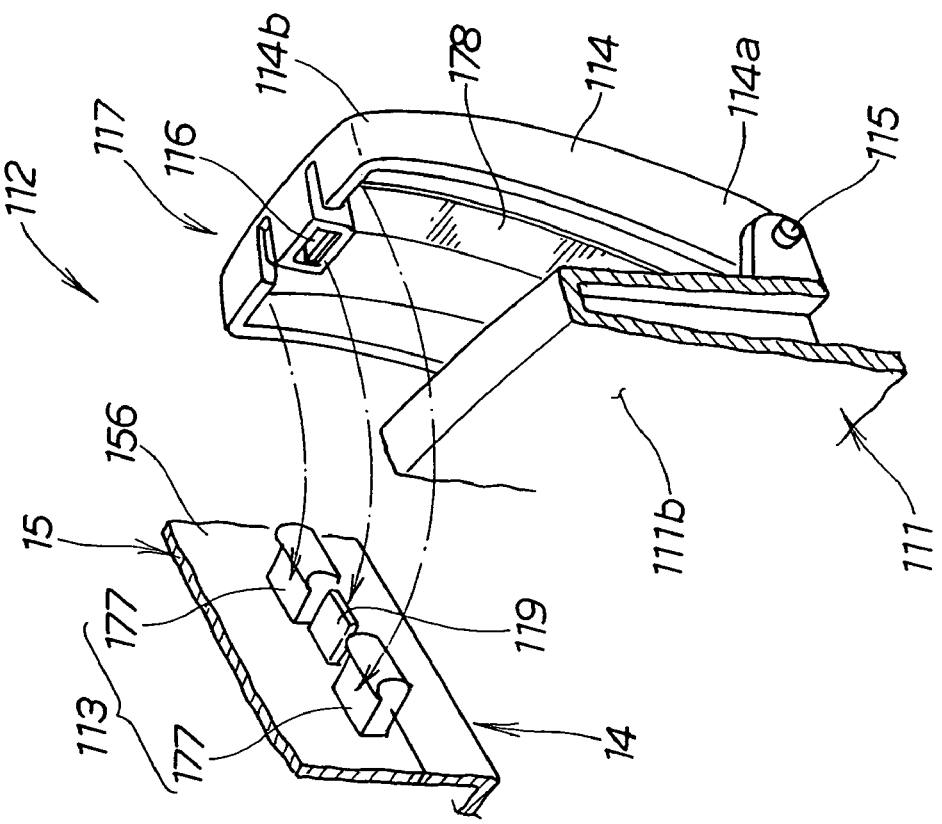
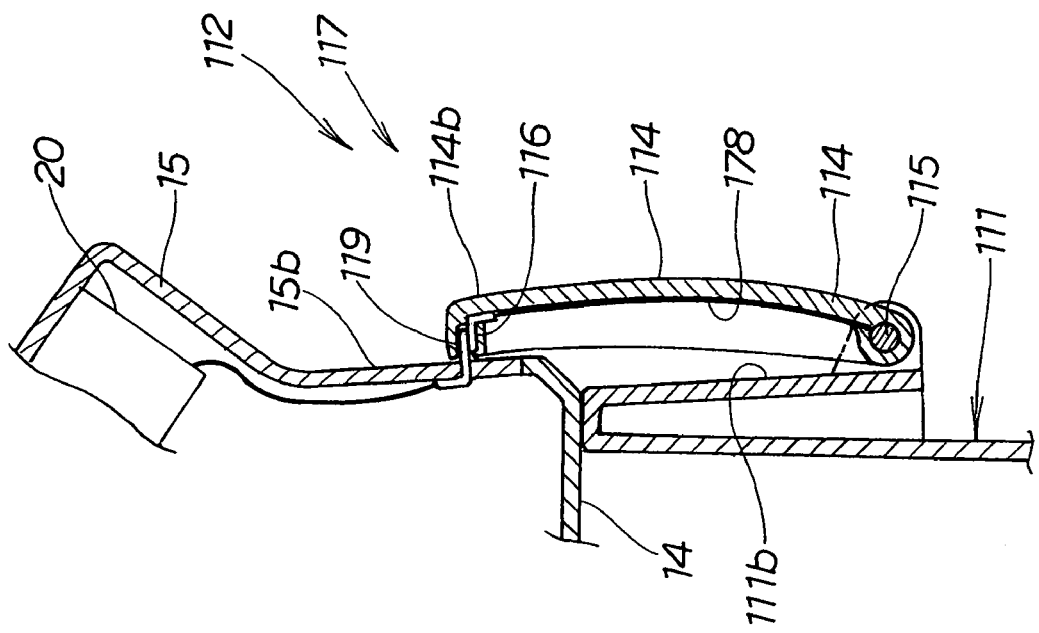

ELECTRIC TILLING MACHINE

FIELD OF THE INVENTION

The present invention relates to an electric tilling machine having a tilling unit driven by an electric motor.

BACKGROUND OF THE INVENTION

From Japanese Utility Model Laid-Open Publication No. SHO-58-124378 (hereinafter simply called "Publication"), etc., walk-behind tilling machines are known which include fenders on left and right sides of a machine body and a cultivating or tilling rotor under the fenders.

FIG. 19 is a front view of the conventional walk-behind tilling machine disclosed in the Publication. The disclosed walk-behind tilling machine 200 includes a pair of pivotable fenders 202 secured to left and right sides of a machine body, and a tilling rotor 204 disposed under the fenders 202. In the walk-behind tilling machine 200, the tilling rotor 204 can be covered with the fenders 202 by causing the fenders 202 to pivot downward from an unfolded position (depicted by imaginary lines) to a folded position (depicted by solid lines). Thus, in loading the tilling machine 200 onto a truck bed or storing the tilling machine 200 in a storage space, a human operator does not worry about his or her clothes getting soiled by inadvertently contacting the tilling rotor 204.

If soil, such as mud, is left sticking to the tilling rotor 204 after cultivation or tillage by the tilling rotor 204, the rotor 204 would be rusted. To avoid the tilling rotor 204 from getting rusty, it is necessary to manually remove the soil from the rotor 204, after the work, using a brush etc. However, because a relatively great number of tilling claws 205 of the rotor 204 have to be manually cleaned one by one, cleaning (normally including washing) of the rotor 204 tends to require a considerable amount of time and labor.

SUMMARY OF THE INVENTION

In view of the foregoing prior art problems, it is an object of the present invention to provide an improved electric tilling machine which can reliably prevent clothes of a human operator from getting soiled by contacting tilling components during transport or storage of the machine and which also allows the tilling components to be readily cleaned without requiring much time and labor.

In order to accomplish the above-mentioned operation, the present invention provides an electric tilling machine, which comprises: a machine body; an electric motor provided on the machine body; a tilling shaft disposed beneath the machine body and operatively connected to the motor, the tilling shaft having one or more tilling claws for tilling earth by the tilling shaft being rotated via the motor; a housing/cleaning box adapted to house and clean the tilling shaft and the tilling claws therein in a cleaning mode, the machine body being removably attachable to the housing/cleaning box, the housing/cleaning box having an opening closable by the machine body when the machine body is attached to the housing/cleaning box; a locking section for locking the machine body to the housing/cleaning box with the tilling shaft and the tilling claws housed in the housing/cleaning box; and a control section for keeping the motor in a controllably operable condition while the machine body is locked to the housing/cleaning box via the locking section.

The tilling machine of the invention can be transported and/or stored with the tilling shaft and tilling claws housed in the housing/cleaning box; thus, the tilling machine can be loaded onto a truck bed or put into a desired stored space without clothes of a human operator contacting the tilling shaft and tilling claws. Further, with the arrangement that the motor is kept in a controllably operable condition as long as the machine body is locked to the housing/cleaning box via the locking section, the tilling shaft and tilling claws can be washed within the box, by controlled driving of the motor, with water supplied into the box.

The electric tilling machine may further comprise a detection section including a locking-side terminal provided on the locking section and a body-side terminal provided on the machine body. In this case, the locking-side terminal is electrically connected to the body-side terminal when the machine body is locked to the housing/cleaning box via the locking section, and the control section keeps the motor in the controllably operable condition while the locking-side terminal is electrically connected to the body-side terminal in the detection section. The motor is kept in the controllably operable condition by the control section as long as the interconnection between the two terminals is detected by the control section. Thus, only during the time that the machine body is locked to the housing/cleaning box by means of the locking section, the tilling shaft and tilling claws can be washed within the housing/cleaning box through the controlled driving of the motor.

BRIEF DESCRIPTION OF THE DRAWINGS

Certain preferred embodiments of the present invention will hereinafter be described in detail, by way of example only, with reference to the accompanying drawings, in which:

FIGS. 11A and 11B are view explanatory of a rear locking structure of the electric tilling machine;

DETAILED DESCRIPTION OF THE PREFERRED EMBODIMENTS

It should be noted that the terms "front", "rear", "left", "right", "upper", "lower", etc. represent directions as viewed by a human operator of an electric tilling machine of the present invention to be detailed hereinbelow.

Figure 1:
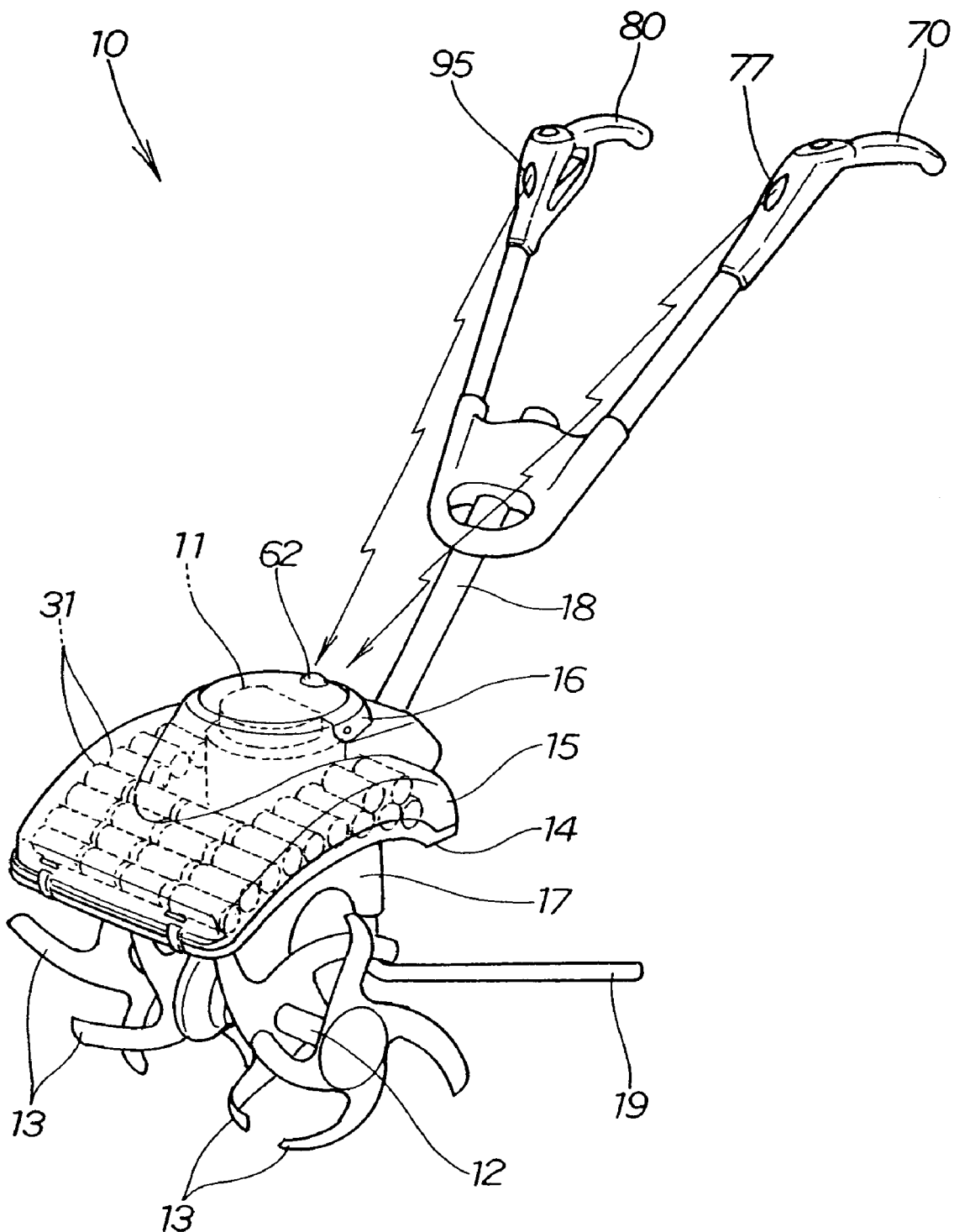
FIG. 1 is a perspective view of an electric tilling machine in accordance with an embodiment of the present invention.

FIG. 1 is a perspective view of an electric tilling machine 10 in accordance with an embodiment of the present invention.

The electric tilling machine 10 of FIG. 1 is a self-propelled, walking-type electric tilling machine, where power generated by an electric motor 11, provided as a drive source of the machine 10, is transmitted to a tilling shaft 12 so that desired tilling work can be performed via a plurality of tilling claws 13 provided as a tilling unit on the shaft 12 and that the machine 10 can travel via the claws 13. The tilling claws 13 are covered at their upper portions with a fender 14, and an upper cover 15 is provided over the fender 14. The electric tilling machine 10 arranged in this manner is also called a front-tine tilling machine.

The tilling shaft 12 is a rotation shaft extending horizontally in a widthwise direction of a machine body 17, and the fender 14 is a cover designed primarily to prevent scattering of earth and sand.

Figure 2:
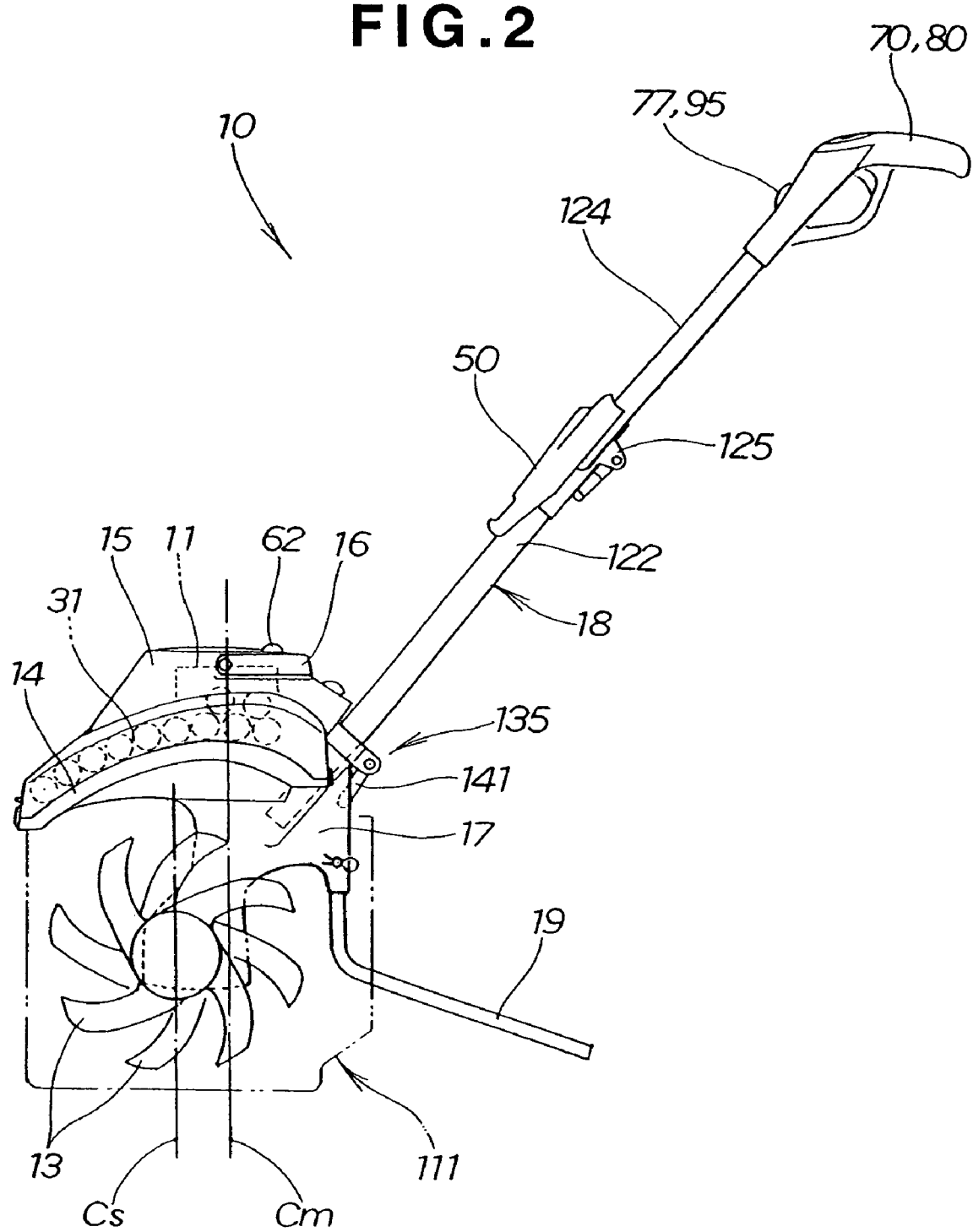
FIG. 2 is a side view of the electric tilling machine of the invention.

FIG. 2 is a side view of the electric tilling machine 10 of the invention.

The electric tilling machine 10 has a very small size so that the human operator can carry the machine by grabbing with his or her single hand a carrying handle 16 provided on the top of the upper cover 15. The tilling machine 10 includes an operating handle section 18 extending rearwardly and upwardly from a rear portion of the machine body 17, and a resisting bar 19 extending rearwardly and downwardly from a rear lower portion of the machine body 17.

The operating handle section 18 includes a handle 124 slidably connected to a handle post 122. Vertically sliding the handle 124 along the handle post 122 can set left and right grip members 70 and 80 at an appropriate height corresponding to a height and preference of the human operator.

Desired work can be performed by the human operator manipulating the operating handle section 18 while walking behind the machine 10. Details of the operating handle section 18 will be described later in relation to FIGS. 6–15.

The resisting bar 19 can be inserted in earth not only to set a tilling depth of the tilling claws 13, but also to produce a resisting force against a traction force by the tilling claws 13.

The tilling machine 10 is also provided with a portable enclosure or housing/cleaning box 111 (depicted by imaginary line) for cleaning (mainly, washing) of a lower portion of the machine body 17, tilling shaft 12, tilling claws 13, etc.

When a lower portion of the machine body 17, tilling shaft 12 (FIG. 1), tilling claws 13, etc. are to be cleaned using the housing/cleaning box 111, the lower portion of the machine body 17, tilling claws 13, etc. are put in the box or enclosure 111, which is suitably configured to receive therein the tilling shaft 12. tilling claws 13, etc. The fender 14 is placed over the upper open end of the enclosure or housing/cleaning box 111 that opens upwardly; that is, the fender 14 functions as a lid closing the upward opening of the box 111. Details of the housing/cleaning box 111 will be explained later.

Figure 3:
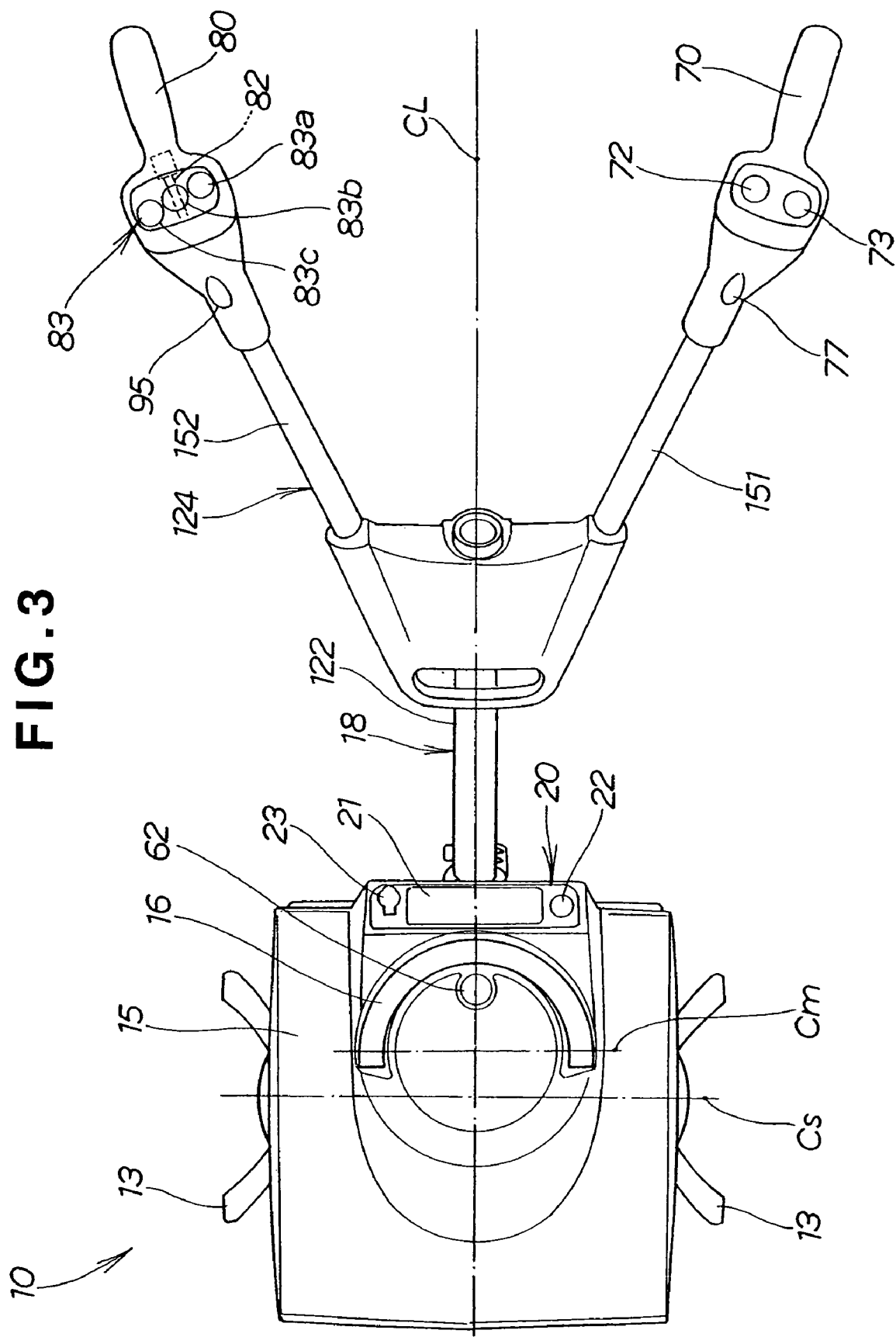
FIG. 3 is a top plan view of the electric tilling machine of the invention.

FIG. 3 is a top plan view of the electric tilling machine 10.

As shown, the electric tilling machine 10 includes a control box 20 provided on a rear upper portion of the upper cover 15, and the control box 20 includes a display section 21 positioned along a machine body centerline CL, a cleaning switch 22 disposed to the left of the display section 21, and a charging socket 23 disposed to the right of the display section 21.

The handle 124 of the operating handle section 18 includes left and right handle portions 151 and 152, and the left and right grip members 70 and 80 are attached to the respective distal ends of the left and right handle portions 151 and 152.

Figure 4A:
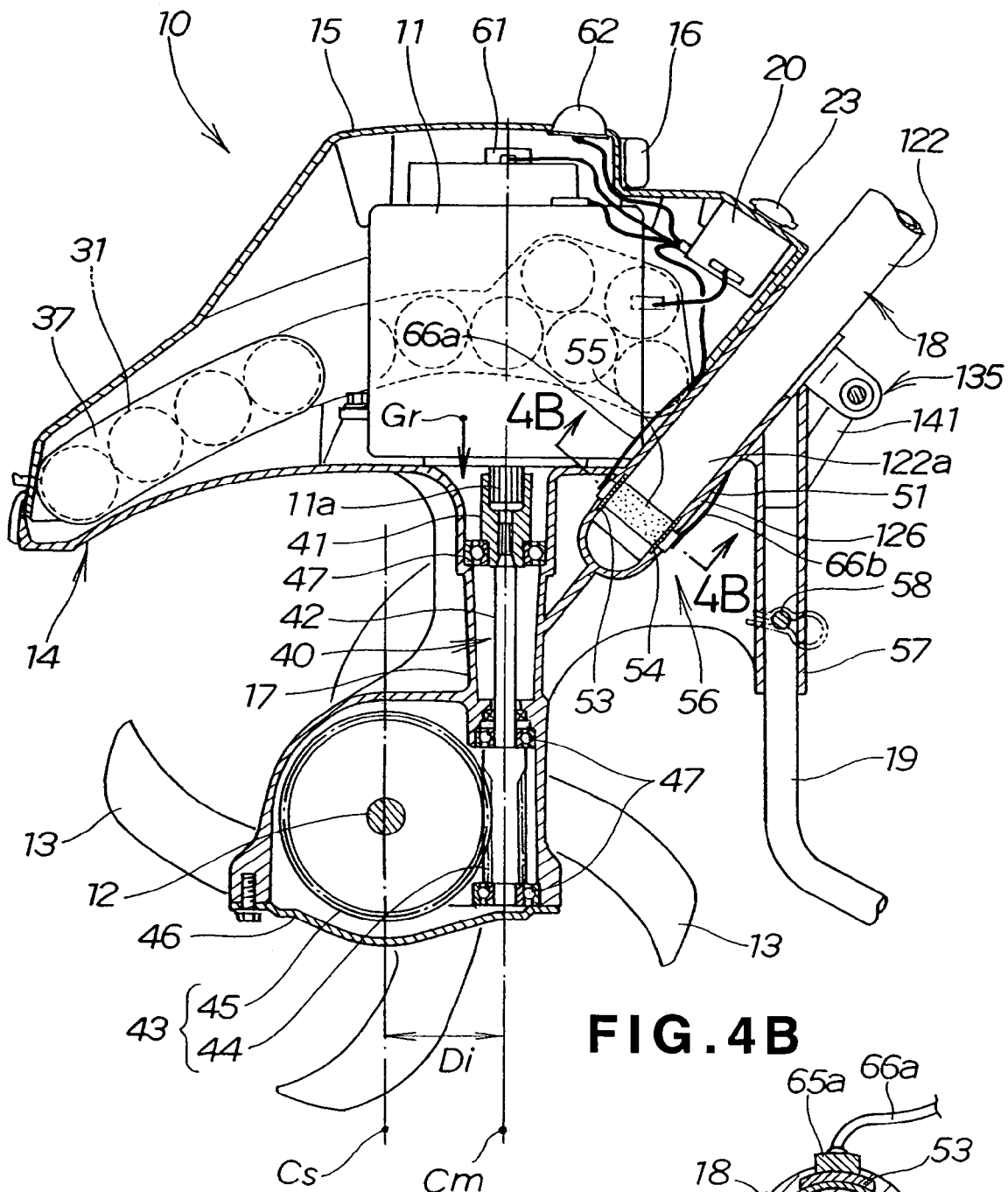
FIG. 4A is a side sectional view of the electric tilling machine of the invention.
Figure 4B:
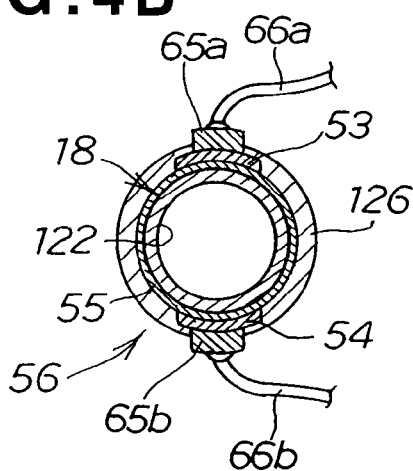
FIG. 4B is a sectional taken along the 4B—4B line of FIG. 4A.

FIG. 4A is a side sectional view of the electric tilling machine 10, and FIG. 4B is a sectional view taken along the 4b—4b line of FIG. 4A.

As illustrated in FIG. 4A, the plurality of tilling claws 13 are mounted in a lower portion of the machine body 17 via a transmission mechanism 40 and the tilling shaft 12, so that power from the motor 11 is transmitted via the transmission mechanism 40 and tilling shaft 12 to the claws 13. The motor 11 has a downward motor shaft 11$a$, and the transmission mechanism 40 is positioned immediately below the motor shaft 11$a$.

The transmission mechanism 40, which is connected to the motor shaft 11$a$ via coupling 41, includes a substantially-vertical transmission shaft 42 positioned coaxially with the motor shaft 11$a$, and a worm gear mechanism 43 for transmitting power from a lower portion of the transmission shaft 42 to the horizontal tilling shaft 12. The worm gear mechanism 43 includes a worm gear 44 provided on the transmission shaft 42, and a worm wheel 45 spline-coupled to the tilling shaft 12.

With the worm wheel 45 coupled to the tilling shaft 12, the worm gear meshing with the worm wheel 45, the transmission shaft 42 extending upward from one end of the worm gear 44, and the transmission shaft 42 connected via the coupling 41 to the motor 11, the worm gear mechanism 43 and transmission shaft 42 are collectively accommodated within the machine body 17 functioning as a transmission case. Reference numeral 46 represents a lid, and 47 a bearing.

As also seen in FIG. 4A, the centerline Cm of the motor 11, i.e. the centerline Cm of the motor shaft 11$a$, is spaced rearwardly from the centerline Cs of the tilling shaft 12 by a distance Di. The distance Di is determined in accordance with sizes of the worm gear 44 and worm wheel 45. Note that the worm gear mechanism 43 may be replaced with another type of gear mechanism, such as a bevel gear mechanism or screw gear mechanism. If the worm gear mechanism 43 may be replaced with a bevel gear mechanism, the centerline Cm of the motor shaft 11$a$ can be set to coincide with the centerline Cs of the tilling shaft 12.

The machine body 17 includes a cylindrical handle support 51 and a cylindrical resisting-bar support 57 both integrally formed therewith, and the handle support 51 extends rearwardly and upwardly from a rear upper portion of the machine body 17 while the resisting-bar support 57 extends downwardly from a rear upper portion of the machine body 17.

The handle post 122 of the operating handle section 18 is secured to the machine body 17, by inserting a proximal end portion 122a of the handle post 122 in a supporting pipe 126 of the handle support 51 and locking the handle post 122 via a locking lever of a handle post locking structure 135.

The handle support 51 has a pair of inner body-side terminals (fixed electrodes) 53 and 54 formed integrally therewith. Specifically, as illustrated in FIG. 4B, the body-side terminals 53 and 54 are provided within the supporting pipe 126 of the handle support 51, and terminals 66a coupled to wire harnesses 65a, 65b are connected at the other end to the body-side terminals 53 and 54. The wire harnesses 65a, 65b are connected to a control section 102 (FIG. 5) within the control box 2, so that the machine-body-side terminals 53 and 54 are controlled to the control section 102.

The operating handle section 18 also includes a handle-side terminal (movable electrode) 55 provided on an outer peripheral surface of the proximal end portion 122a of the handle post 122.

Combination of the pair of body-side terminals 53, 54 and the handle-side terminal 55 constitutes a handle attachment switch 56. The body-side terminals 53 and 54 can be electrically interconnected via the handle-side terminal 55 by inserting the proximal end portion 122a of the handle post 122 from above into the supporting pipe 126, of the handle support 51. On the other hand, the body-side terminals 53 and 54 can be electrically disconnected by pulling upward the proximal end portion 122a of the handle post 122 out of the supporting pipe 126.

The resisting bar 19 is inserted in the resisting-bar support 57 from below and secured to the support 57 via a pin 58.

Rotation sensor (rotation speed detector) 61 for detecting a rotating speed (i.e., actual rotating speed) of the motor 11 is provided at the top of the motor 11, one or more batteries 31 are disposed between the fender 14 and the upper cover 15, and a receiver 62 is disposed on a rear upper portion of the upper cover 15.

Figure 5:
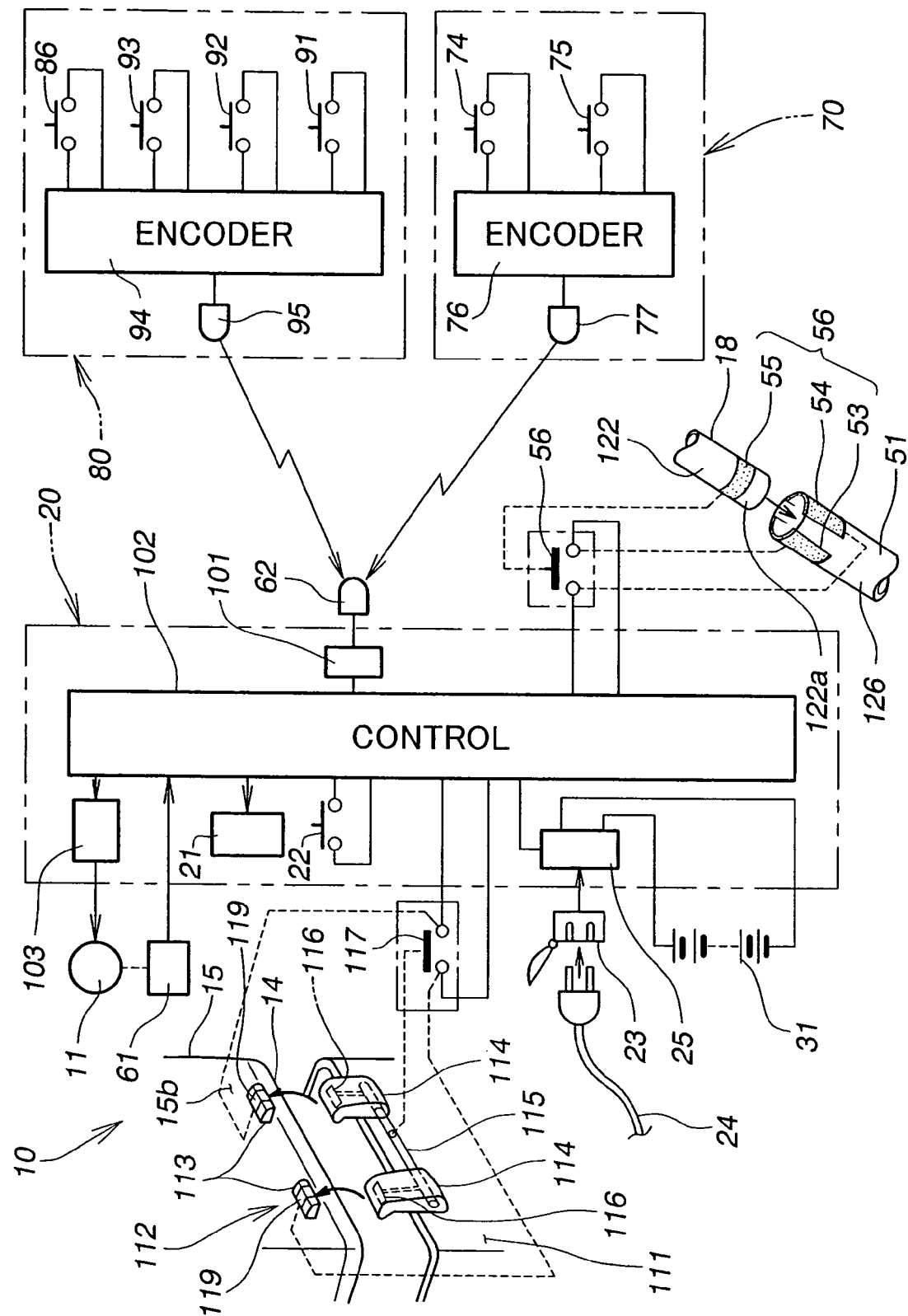
FIG. 5 is a diagram showing electric circuitry of the electric tilling machine of the invention.

FIG. 5 is a diagram showing electric circuitry of the electric tilling machine, which particularly illustrates electric circuits associated with the control box 20 and the left and right grip members 70 and 80.

The left grip member 70 is provided with a work starting switch 74, main switch 75, encoder 76 and transmitter 77. The right grip member 80 is provided with a work preparing switch 86, low speed switch 91, medium speed switch 92, high speed switch 93, encoder 94 and transmitter 95.

The control box 20 includes a decoder (signal decoding circuit) for decoding each radio signal received via the receiver 62, the above-mentioned control section 102, and a motor drive circuit 103.

Operation signal output from any of the switches of the left and right grip members 70 and 80 is encoded via the corresponding encoder 76, 94, and the resultant encoded signal is transmitted as a radio signal by the corresponding transmitter 77, 95. The radio signal from the transmitter 77, 95 is received via the receiver 62 and then decoded by the decoder 101, and the resultant decoded signal is supplied to the control section 102.

Here, the "radio signal" is a signal that can be transmitted from the transmitter 77, 95 to the receiver 62 via wireless communication; for example, the radio signal may be an infrared signal or electromagnetic wave signal. In the case where an infrared signal is used as the radio signal, the transmitters 77 and 95 may comprise light emitting elements, and the receiver 62 may comprise a light receiving element.

The display section 21 of the control box 20 displays operating states of the tilling machine 10, a remaining amount of electric power and charged state of the batteries 31, a state of cleaning by the housing/cleaning box 111, etc.

The cleaning switch 22 of the control box 20 is operable to start or stop the rotation of the motor 11 when a cleaning operation by the housing/cleaning box 111 is to be started or stopped. Specifically, the cleaning switch 22 is in the form of a depression button switch of the well-known automatically-resettable type, which is kept in the ON (activated) state only while it is being depressed, and it is turned off once the human operator releases the switch.

The charging socket 23 is a connector for connection with an external charging cord 24 to charge the battery 31 via a charger 25.

The control section 102 is supplied with a signal from any of the cleaning switch 22, battery charger 25, handle attachment switch 56, rotation sensor 61 and detection section (including a cleaning state detector and cleaning box switch) 117, as well as a decoded signal from the decoder 101. In this way, the control section 102 issues a display signal to the display section 21 and controls the rotation of the motor 11 via the motor drive circuit 103.

Further, when the body-side terminals 53 and 54 are electrically interconnected via the handle-side terminal 55 by the human operator inserting the proximal end portion 122a of the handle post 122 into the handle support 51, the control section 102 controls the tilling claws (tilling unit) 13 to work in response to operation, by the human operator, of any of the operating buttons 72, 73 and 83 on the handle 124 (see FIG. 3) and operation preparing lever 82. Thus, the human operator can cause the tilling claws 13 to work as desired by operating any of the operating buttons 72, 73 and 83 on the handle 124 (see FIG. 3) and work preparing lever 82.

In addition, when the body-side terminals 53 and 54 are electrically disconnected from each other by the human operator pulling the proximal end portion 122a of the handle post 122 out of the handle support 51, the control section 102 controls the tilling claws (tilling unit) 13 to not work despite operation, by the human operator, of any of the operating buttons 72, 73 and 83 on the handle 124 (see FIG. 3) and work preparing lever 82.

Therefore, there is no need to provide the main switch on the handle 124 in order to prevent the tilling claws 13 from being driven in response to operation, by the human operator, of any of the operating buttons on the handle 124 when the proximal end portion 122a of the handle post 122 is removed from the handle support 51. Such an arrangement can eliminate a need for the human operator to turn off the main switch when proximal end portion 122a of the handle post 122 has been pulled out of the handle support 51.

The machine body 17 is removably attached to the housing/cleaning box or enclosure ill with the fender 14 placed on and fixed to the top of the box 111 via a locking structure 112. The locking structure 112 is of a snap-fit type, which includes a pair of rear locking projection sections or first locking parts 113 provided on a rear end portion of the fender 14 and engageable with a pair of rear engaging portions or second locking parts 114 provided on rear end portions of the box 111. The machine body 17 is secured to the housing/cleaning box 111 by bringing the rear engaging portions (second locking parts) 114 of the box 111 into engagement with the locking projection sections (first locking parts) 113 of the body 17.

Each of the rear locking projection sections 113 includes a cover-side terminal (fixed electrode) 119 electrically connected to the control section 102. Each of the pair of rear engaging portions 114, which are secured via an electrically-conductive hinge pin 115, includes a locking-side terminal (movable electrode) 116 electrically connected to the hinge pin 115.

Combination of the cover-side terminals 119, locking-side terminals 116 and hinge pin 115 constitutes the above-mentioned detection section 117.

With the rear engaging portions 114 in engagement with the locking projection sections 113, the locking-side terminals 116 are electrically connected to the cover-side terminals 119, and the cover-side terminals 119 are electrically interconnected via the locking-side terminals 116 and hinge pin 115.

Namely, the detection section 117 is constructed in such a manner that, when the machine body 17 is secured via the locking structure 112 to the housing/cleaning box 111, the locking-side terminals 116 are connected with the cover-side terminals 119 to electrically interconnect the cover-side terminals 119 via the locking-side terminals 116 and hinge pin 115.

The electrical interconnection of the cover-side terminals 119 is detected by the control section 102. Thus, that the machine body 17 has been secured to the housing/cleaning box 111 can be detected by the control section 102, so that the control section 102 keeps the electricmotor 11 in a controllably operable condition in a cleaning mode.

Thus, by the human operator depressing the cleaning switch 22 with the machine body 17 secured via the locking structure 112, a signal indicative of the depression of the switch 22 is supplied to the control section 102, which in turn outputs a drive signal to the motor 11 so that the motor 11 can be driven in the cleaning mode.

Figure 6:
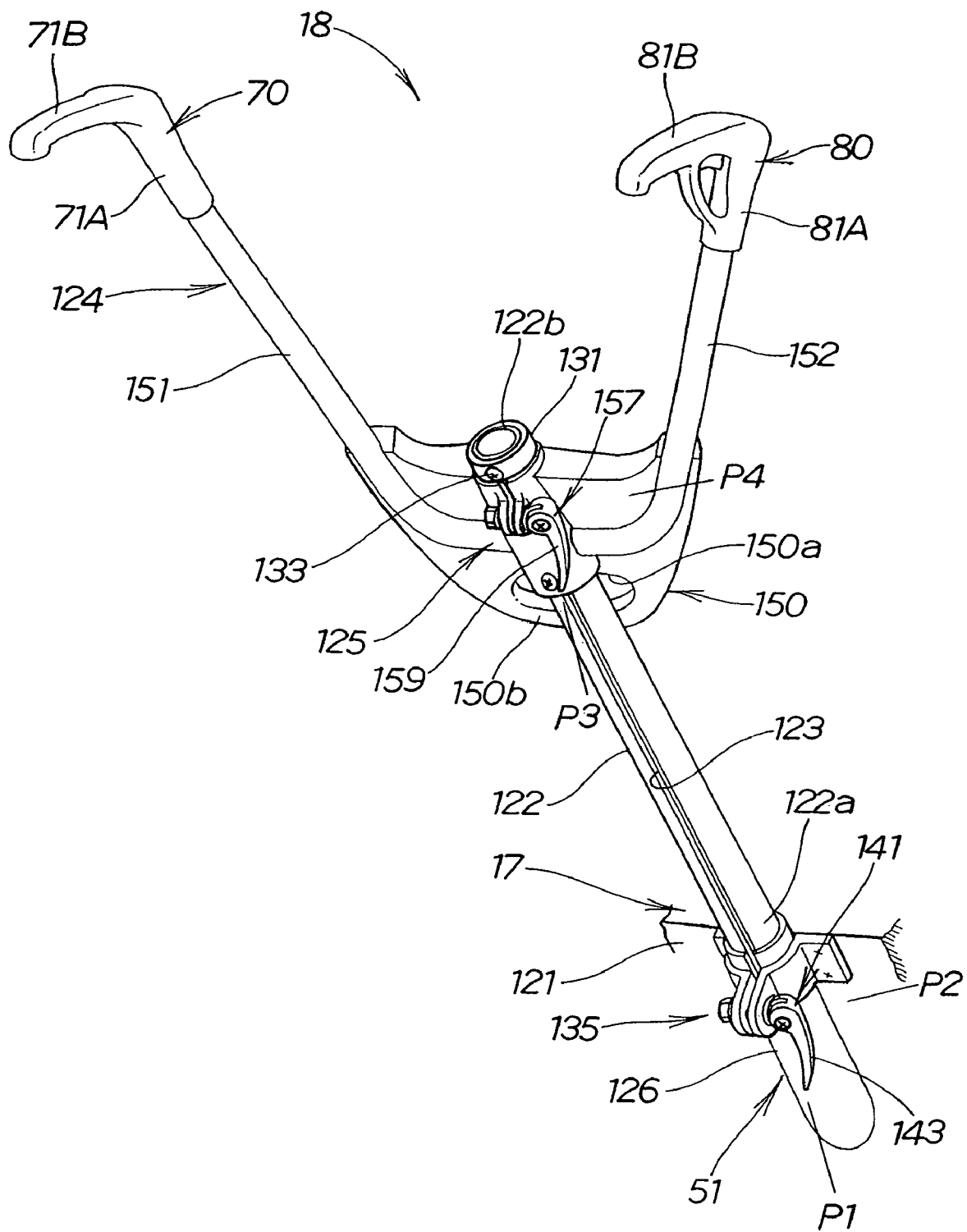
FIG. 6 is a rear perspective view of an operating handle section of the electric tilling machine of the invention.

FIG. 6 is a rear perspective view of the operating handle section 18 of the electric tilling machine.

As shown, the handle support 51, removably supporting therein the proximal end portion 122a of the handle post 122, is disposed on a rear portion 121 of the machine body 17, and the handle 124 is supported by the handle post 122 for movement between the proximal end portion 122a and a distal end portion 122b of the handle post 122. Handle locking structure 125 for locking the handle 124 at a desired position of the handle post 122 is provided on the handle 124. The handle locking structure 125 includes a locking lever 141, via which the handle 124 can be retained at a desired position of the handle post 122.

Figure 7:
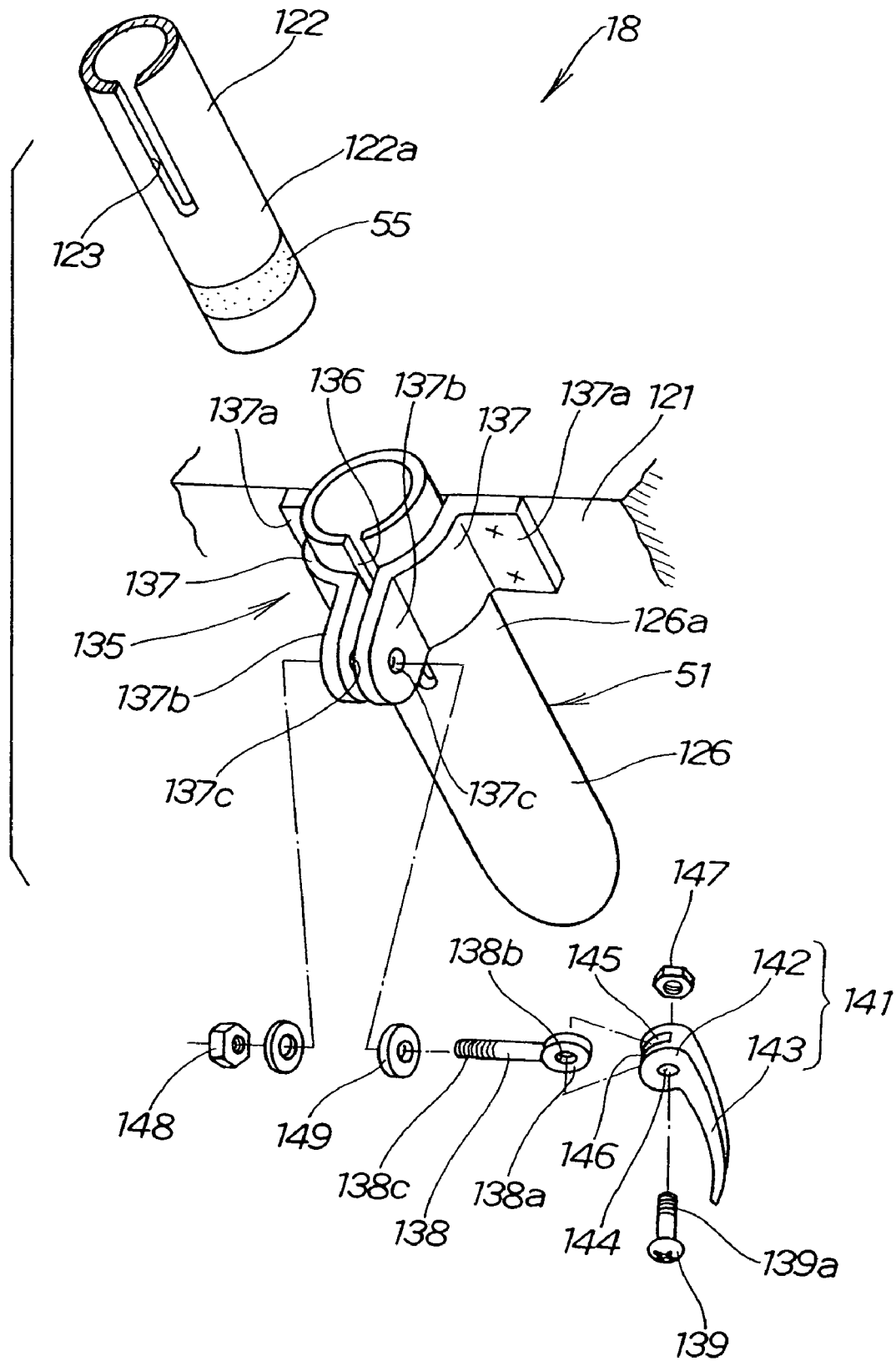
FIG. 7 is a perspective view of a handle support for the operating handle section employed in the electric tilling machine of the invention.

FIG. 7 is a perspective view of the handle support 51 of the operating handle section 18 employed in the electric tilling machine 10 of the invention.

The handle support 51 includes the supporting pipe 126 positioned at the rear machine body portion 121, and a handle post locking mechanism 135 provided on an upper end portion 126a of the supporting pipe 126.

The handle post locking mechanism 135 includes a slit 136 formed in the upper end portion 126a of the pipe 126, and a pair of fastening brackets 137 disposed on the outer periphery of the upper end portion 126a and having respective base portions secured to the rear machine body portion 121. Left and right projecting portions 137b of the fastening brackets 137 are opposed to each other with a predetermined distance therebetween at a position corresponding to the slit 136, a fastening bolt 138 is inserted through holes 137c formed in the respective projecting portions 137b, and the locking lever 141 is secured to a head portion 138a of the bolt 138 via a securing bolt 139.

The locking lever 141 has a bifurcated cam portion 142 and a lever portion 143. The bifurcated cam portion 142 has a receiving groove 145 formed substantially centrally of its thickness, a pair of inner and outer central mounting holes 144 (only one of the central mounting holes 144 is shown) opposed to each other in a direction transverse to the holes 144, and an outer cam surface 146.

The head portion 138a of the fastening bolt 138 is inserted in the receiving groove 145, and the securing bolt 139 is inserted through the central mounting holes 144 of the cam portion 142 and a mounting hole 138b of the head portion 138a. Nut 147 is screwed on a threaded portion 139a of the securing bolt 139 that projects beyond the other inner mounting hole 144, a nut 148 is screwed on a threaded portion 138c of the securing bolt 139 that projects beyond the left projecting portion 137b. The right projecting portion 137b is pressed by the cam surface 146 via a washer 149, to thereby support the upper end portion 126a of the supporting pipe 126 via the opposed projecting portions 137b.

The cam surface 146 is formed such that the projecting portions 137b are opposed to each other with a smaller distance when the lever portion 143 is in a locking position P1 (FIG. 6) while the projecting portions 137b are opposed to each other with a greater, i.e. normal, distance when the lever portion 143 is in an unlocking position P2 (FIG. 6).

The slit 136 in the supporting pipe 126 can be reduced in its width by holding the lever portion 143 in the locking position P1 to thereby reduce the distance between the projecting portions 137b. Thus, the inner diameter of the upper end portion 126a of the supporting pipe 126 is reduced so that the proximal end portion 122a of the handle post 122 inserted in the pipe 126 can be held tightly and thus locked by the pipe 126.

The slit 136 in the supporting pipe 126 can be increased in its width by shifting the lever portion 143 to the unlocking position P2 to thereby increase the distance between the projecting portions 137b. Thus, the inner diameter of the upper end portion 126a of the supporting pipe 126 is increased so that the proximal end portion 122a of the handle post 122 inserted in the pipe 126 is loosened and thus unlocked by the pipe 126.

Figure 8:
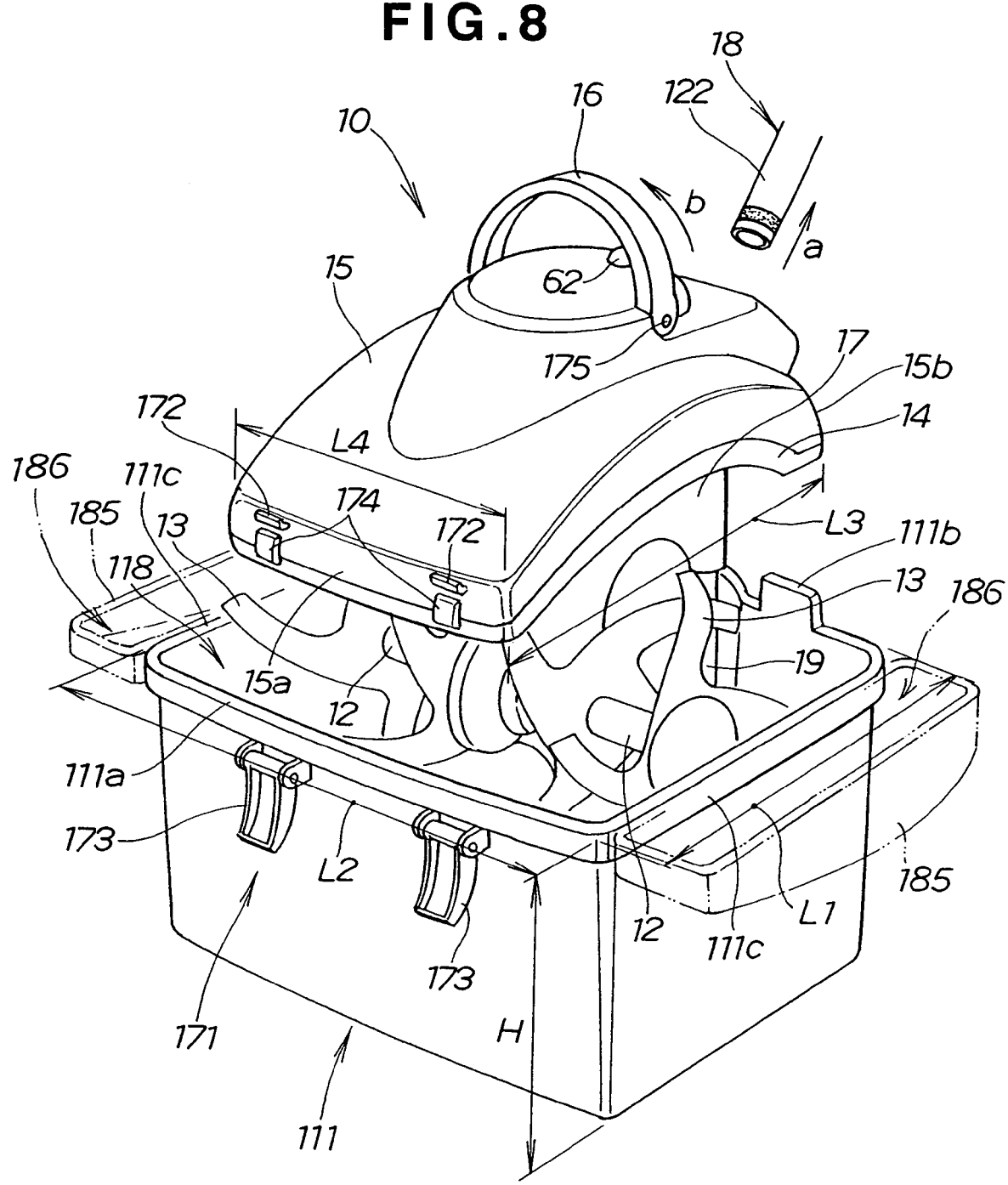
FIG. 8 is a perspective view showing relationship between a housing/cleaning box and a machine body and other components provided on and around the machine body.

FIG. 8 is a perspective view showing relationship between the housing/cleaning box or enclosure 111 and the machine body 17 and other components provided on and around the body 17.

As an example, the housing/cleaning box 111 is in the form of a translucent box of a rectangular section having an upward opening 118. The machine body 17 has a length L1 in the front-and-rear direction of the machine, a length L2 in the left-and-right direction of the machine and a height H set so as to house therein various components located under the fender 14, such as the tilling shaft 12, tilling claws 13 and resisting bar 19. Note that the resisting bar 19 is shown in FIG. 8 as being held in its non-tilling (rest) position (see also FIGS. 10 and 12) horizontally inverted or retracted from its tilling (use) position of FIG. 2.

The length L1 of the housing/cleaning box 111 is substantially the same as a length, in the front-and-rear direction, of the fender 14, and the length L2 of the box 111 is greater than a length L4, in the left-and-right direction, of the fender 14.

Figure 9:
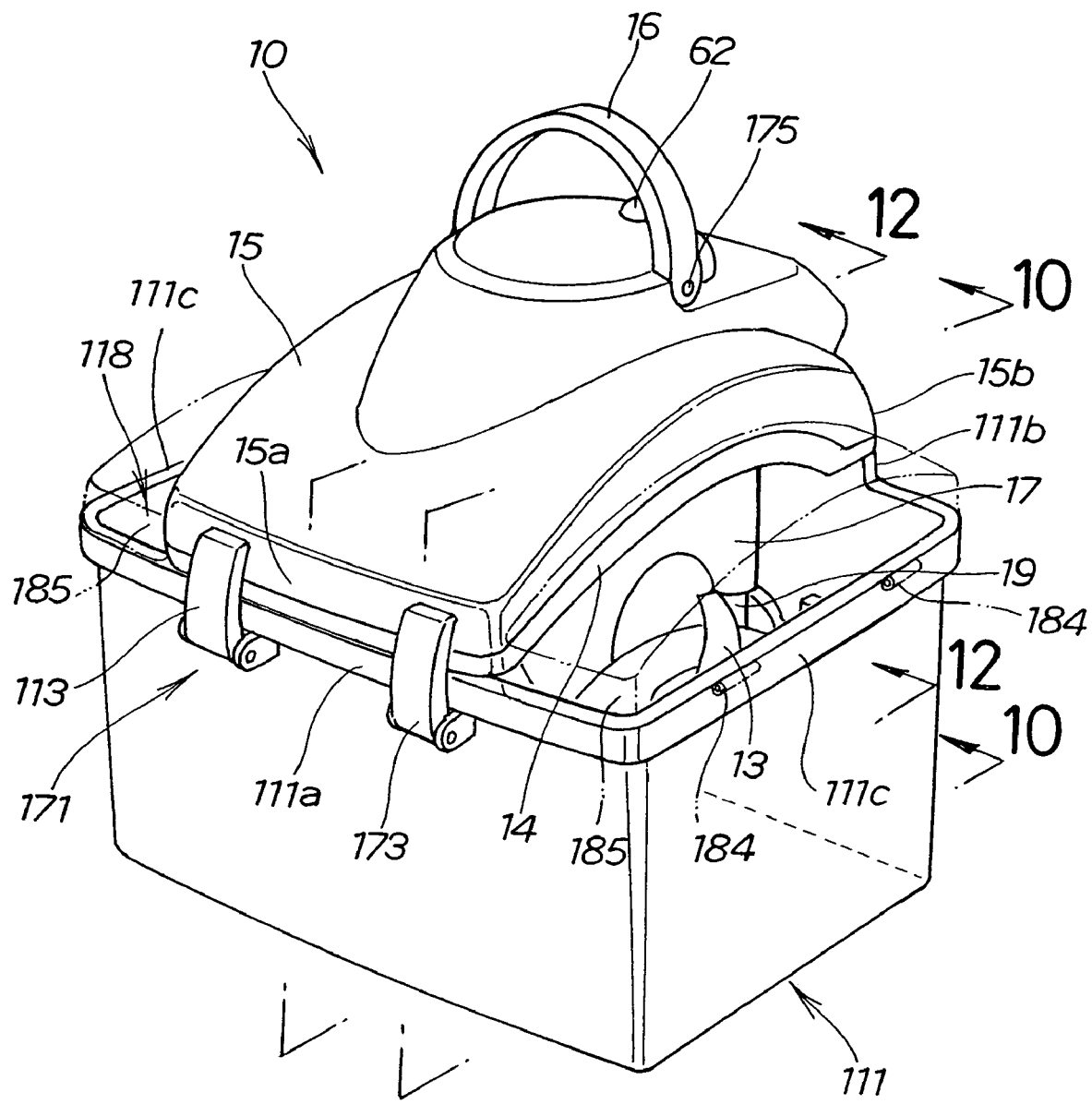
FIG. 9 is a perspective view showing the machine body having been attached to the housing/cleaning box.

Further, the housing/cleaning box 111 includes left and right side covers 185 pivotally provided on its opposite sides 11c via hinges (see FIG. 9). Each of the side covers 185 is pivotable via the hinge 184 between an open position (i.e., position shown in the figure) and a closed position (i.e., position shown in FIG. 9). Each of the side covers 185 may have a pocket 186 for storing tools (not shown), batteries for the motor 11, charger and other small-size items.

Front and rear locking structures 171 and 112 are provided for locking the fender 14 to the housing/cleaning box 111. The front locking structure 171 is of a snapfit type, which includes a pair of front locking projection sections or first locking parts 172 formed on a front portion 15a of the upper cover 15 and a pair of front engaging portions or second locking parts 173 formed on a front portion 111a of the box 111. Reference numeral 174 represents a locking structure for locking together the fender 14 and the upper cover 15.

To house the components located under the fender 14, such as the tilling shaft 12, tilling claws 13 and resisting bar 19 in the housing/cleaning box 111, the handle post 122 of the operating handle section 18 is taken out of the handle support 51 (see FIG. 7), as depicted by arrow "a" of FIG. 8. Then, the carrying handle 16 provided on the top of the machine body 17 is caused to pivot upwardly about a pivot pin 175, as depicted by arrow "b", from the position of FIG. 1, so that the components located under the fender 14 can be housed in the housing/cleaning box 111 with the carrying handle 16 held by the human operator.

FIG. 9 is a perspective view showing the tilling machine 10 having been attached to the housing/cleaning box 111.

Namely, the machine body 17 is locked in a predetermined position to the housing/cleaning box or enclosure 111 via the front and rear locking structures 171 and 112, after the components located under the fender 14, such as the tilling shaft 12, tilling claws 13 and resisting bar 19, are housed in the housing/cleaning box 111, and the front and rear portions 15a and 15b of the upper cover 15 placed on the front and rear portions 111a, respectively, of the box 111.

Because the length L2 of the box 111 is greater than the length L4 of the fender 14, there would be formed unclosed open areas in the opening 16 adjacent to left and right sides of the fender 14 when the tilling shaft 12, tilling claws 13 and resisting bar 19, are housed in the housing/cleaning box 111.

This is because the side covers 185 are pivotally connected via the hinges 184 to the opposite sides 11c of the housing/cleaning box 111 for closing the left and right unclosed open areas. The hinges 184 may be of the well-known type; alternatively, the hinges 184 may be formed integrally with the side covers 185 and box 111, all made of resin, to have such a relatively small thickness as to permit resilient deformation of the hinges 184.

In the above-described manner, the tilling machine 10 can be transported and/or stored with the tilling shaft 12 and tilling claws 13 housed in the housing/cleaning box 111; thus, the tilling machine 10 can be loaded onto a truck bed or put into a desired stored space without clothes of the human operator contacting the tilling shaft 12 and tilling claws 13. This way, the clothes of the human operator can be prevented from getting soiled by contacting the tilling shaft 12 and claws 13 during transport, storage, etc. of the tilling machine 10.

Further, with the front and rear locking structures 171 and 112, the housing/cleaning box 111 can be reliably fixed to the machine body 17. Therefore, the electric cultivator 10 can be handled with ease at the time of transport and storage of the machine 10.

Figure 10:
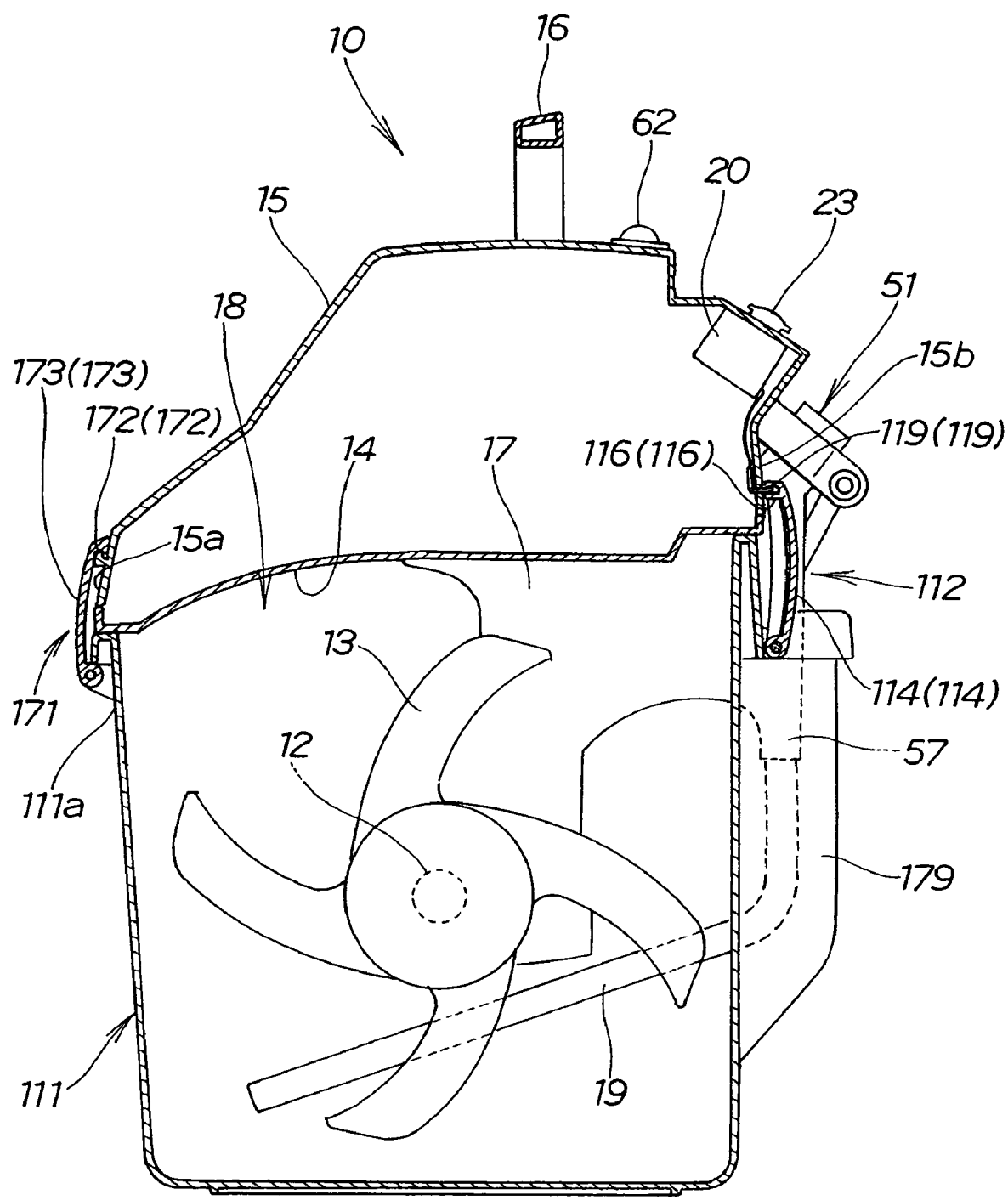
FIG. 10 is a sectional view taken along the 10—10 line of FIG. 9.

FIG. 10 is a sectional view taken along the 10—10 line of FIG. 9.

The resisting bar 19 supported by the resisting bar support 57 is positioned beneath the tilling shaft 12 and orientated forward, to permit storage, in the housing/cleaning box 111, of the tilling shaft 12, tilling claws 13 and resisting bar 19. With the front engaging portions 173 of the front box portion 111a engaging with the front locking projection sections 172 of the upper cover 15, the locking structure 171 locks together the front portion 15a of the cover 15 and front portion 111a of the box 111.

Similarly, with the rear engaging sections 114 of the rear box portion 111b engaging with the rear locking projection sections 113 of the upper cover 15, the locking structure 112 locks together the rear portion 15b of the cover 15 and rear portion 111b of the box 111.

The cover-side (machine-side) terminals 119 are provided on the rear locking projection sections 113, while the locking-side terminals 116 are provided at distal end regions of the rear engaging sections 114. Thus, by bringing the rear engaging sections 114 into engagement with the rear locking projection section 113, the locking-side terminals 116 are electrically connected to the cover-side terminals 119.

FIGS. 11A and 11B are views explanatory of the rear locking structure 112 of the electric tilling machine 10.

As explained above in relation to FIG. 5, the detection section 117 comprises a combination of the cover-side terminals 119, locking-side terminals 116 and hinge pin 115.

For example, the rear locking projection section 113 of the rear locking structure 112 includes a pair of left and right locking projections 177, and the cover-side terminal 119 is provided between the left and right locking projections 177.

The rear engaging section 114, on the other hand, includes a base 114a secured via the conductive hinge pin 115 to the rear portion 111b of the housing/cleaning box 111, and the locking-side terminal 116 is provided on a distal end portion 114b of the engaging section 114 in such a manner that the hinge pin 115 and terminal 116 are electrically connected with each other via a conductor section 178.

With the rear locking projection section 113, i.e. the locking projections 177, of the rear locking structure 112 engaging with the rear engaging section 114, the rear portion 15b of the upper cover 15 and the rear portion 111b of the housing/cleaning box 111 are locked together, and the locking-side terminal 116 is electrically connected to the cover-side terminal 119.

By thus electrically connecting the two locking-side terminal 116 to the corresponding cover-side terminal 119, the detection section 117 is turned on, i.e. set to a conducting state. The conducting state of the detection section 117 is detected by the control section 102 (FIG. 5), so that the control section 102 can detect that the machine body 17 has been locked to the storing/locking box 111.

It should be understood that the rear locking structure 112 and detection section 117 are not limited to the above-described construction. What is essential here is that the detection section 117 is automatically turned on as the rear portion 15b of the upper cover 15 and the rear portion 111b of the housing/cleaning box 111 are locked together via the rear locking structure 112.

Figure 12:
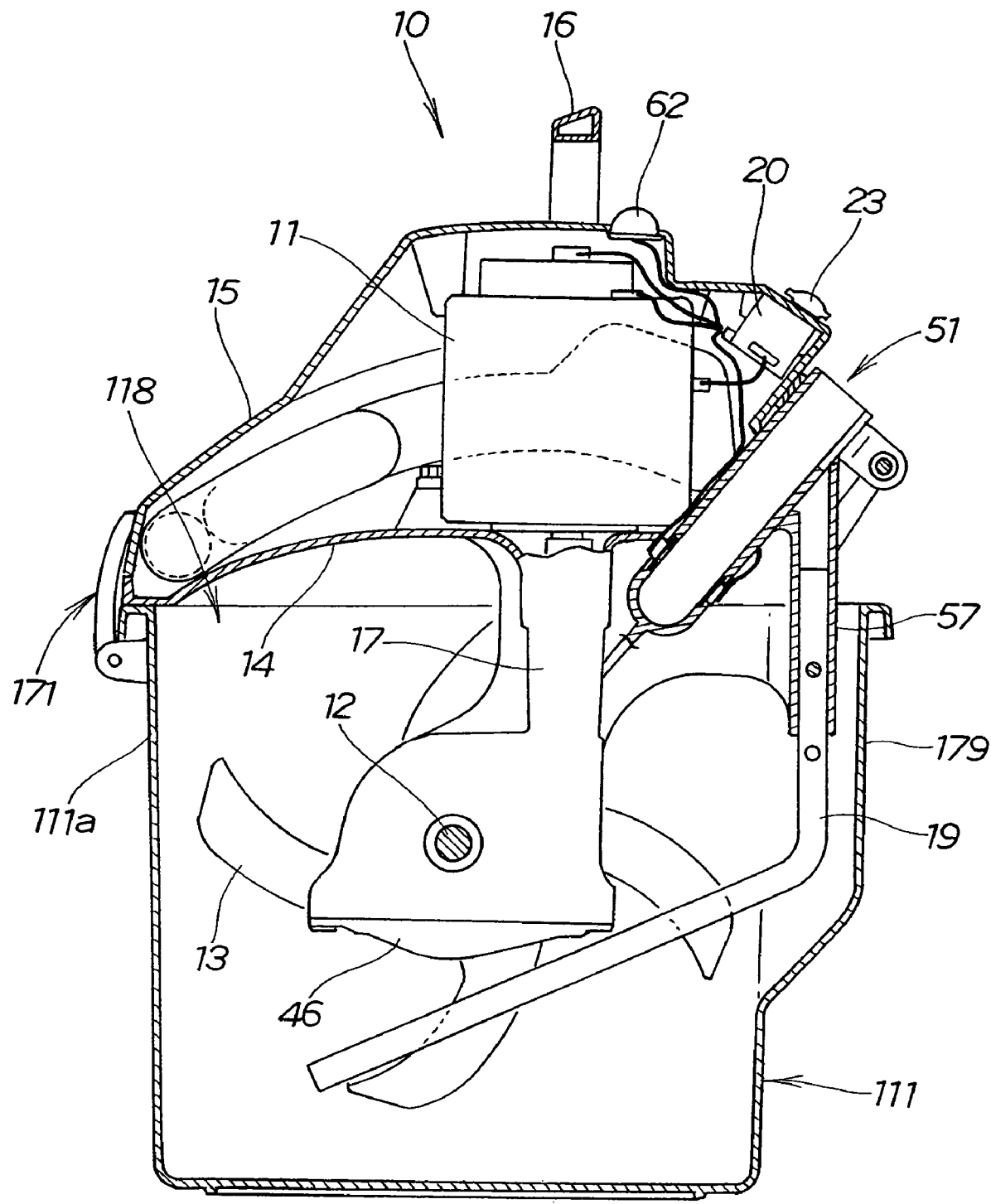
FIG. 12 is a sectional view taken along the 12—12 line of FIG. 9.

FIG. 12 is a sectional view taken along the 12—12 line of FIG. 9. As shown, on a rear center region of the housing/cleaning box 111, there is formed a rearward bulging portion 179 (see also FIG. 10) to permit the resisting-bar support 57 to be housed in the box 111. With the resisting bar 19 held by the support 57 beneath the tilling shaft 12 and orientated in the forward direction, the machine body 17 as a transmission case, lid 46, tilling shaft 12, tilling claws 13, resisting bar 19, etc. can be stored in the housing/cleaning box 111.

Figure 13:
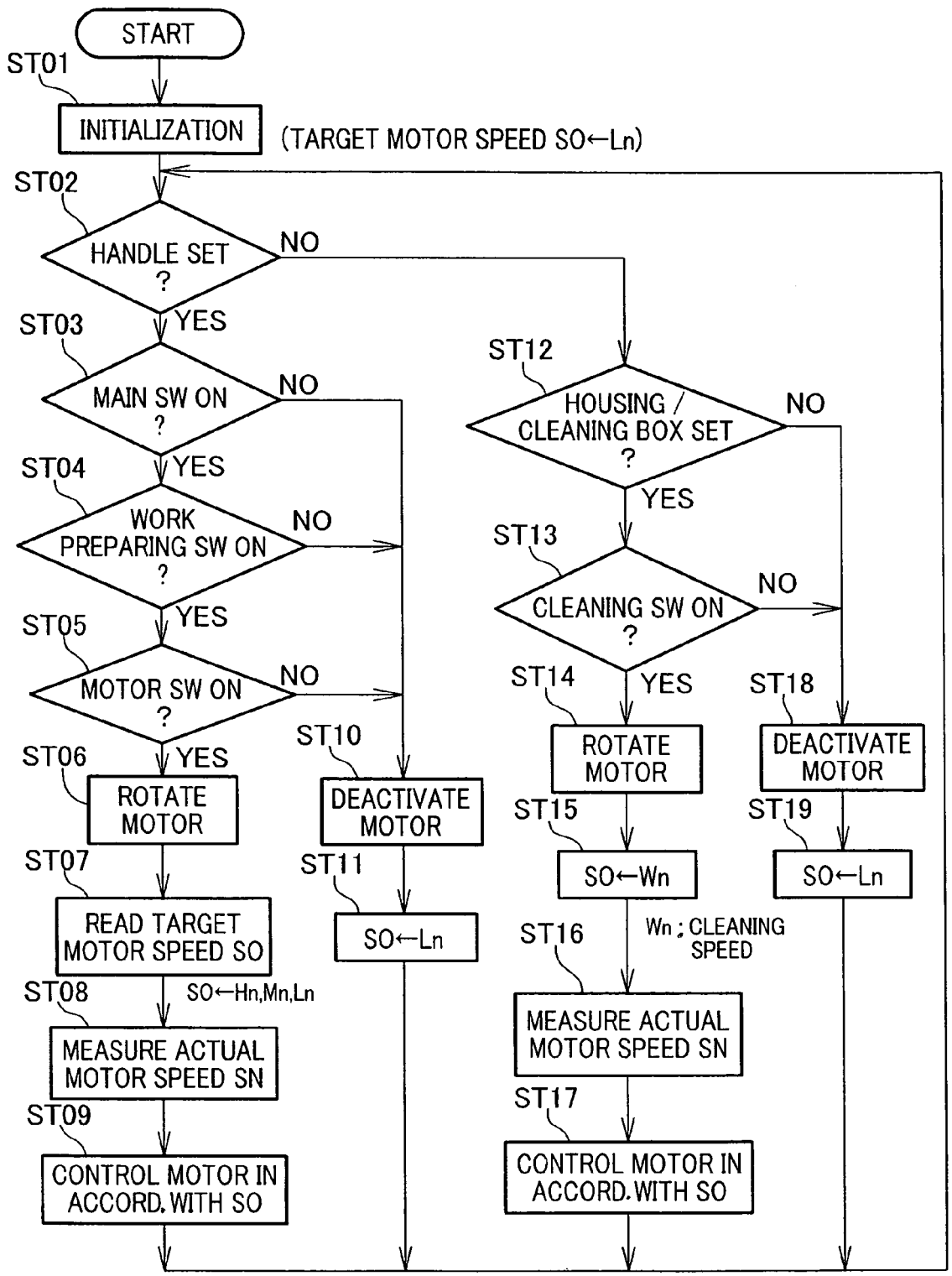
FIG. 13 is a flowchart explanatory of example behavior of the electric tilling machine of the invention.

Now, a description will be given about behavior of the electric tilling machine 10, with reference to FIGS. 13–18. FIG. 13 is a flow chart explanatory of example behavior of the electric tilling machine 10. The following paragraphs describe the example behavior of the electric tilling machine 10 with primary reference to FIG. 13 and FIG. 5.

Step ST01: Necessary initialization is executed. For example, a target rotation speed SO of the motor is set at a "low speed" Ln that is equal in value to the rotation speed set via the low speed switch 91.

Step ST02: Determination is made as to whether the operating handle 18 has been set in the handle support 51. With an affirmative or YES determination, control proceeds to step ST03, while, with a negative or NO determination, control proceeds to step ST12. If the handle attachment switch 56 is ON, then it is determined that the operating handle 18 has been set in the handle support 51.

Step ST03: Determination is made as to whether the main switch 75 is ON (i.e., whether an ON switch signal has been generated). With a YES determination, control proceeds to step ST04, while, with a NO determination, control proceeds to step ST10.

Step ST04: Determination is made as to whether the work preparing switch 86 is ON. With a YES determination, control proceeds to step ST05, while, with a NO determination, control proceeds to step ST10.

Step ST05: Determination is made as to whether the work starting switch (motor switch) 74 is ON. With a YES determination, control proceeds to step ST06, while, with a NO determination, control proceeds to step ST10.

Step ST06: If the four conditions have been satisfied at steps ST02, ST03, ST04 and ST05 above, i.e. if affirmative determinations have been made at all of steps ST02, ST03, ST04 and ST05, the electric motor 11 is activated or caused to rotate. Namely, the electric motor 11 is caused to rotate, only upon satisfaction of the first condition that the operating handle 18 has been set in the handle support 51, the second condition that the main operating button has been depressed (i.e., the main switch 75 has been depressed or turned on), the third condition that the work preparing lever has been shifted to a predetermined position (i.e., the work preparing switch 86 has been turned on) and the fourth condition that the work starting button has been depressed (i.e., the work starting switch 74 has been turned on).

Step ST07: The target motor rotation speed SO is read which is currently set by turning-on of the low speed switch 91, medium speed switch 92 or high speed switch 93. If the high speed switch 93 has been turned on, the target motor rotation speed SO is set to the high speed Hn, if the medium speed switch 92 has been turned on, the target motor rotation speed SO is set to the medium speed Mn, and if the low speed switch 91 has been turned on, the target motor rotation speed SO is set to the low speed Ln.

Note that the high speed Hn, medium speed Mn and low speed Ln are set at respective predetermined speed values presenting relationship of "Hn>Mn>Ln". When no rotation speed is set by any one of the switches 91–93, the target motor rotation speed SO is set as default at the low speed Ln.

Step ST08: Actual rotation speed SN of the motor 11 is measured, for example, by the rotation sensor 61 measuring an actual number of rotations of the motor 11.

Step ST09: Control reverts to step ST02 after controlling the motor 11 in accordance with the currently-set target motor rotation speed SO. Namely, the motor 11 is controlled such that the actual rotation speed SN equals the currently-set target motor rotation speed SO. The target motor rotation speed SO is provided as a PI (Proportional and Integral) control signal in the case of the PI control, but as a PID (Proportional, Integral and Differential) control signal in the case of the PID control. Alternatively, such a control signal may be a PWM (Pulse With Modulation) signal.

Step ST10: The motor 11 is deactivated upon satisfaction of any one of a first condition that the main operating button has been depressed again (the main switch 75 has been turned off), a second condition that the work preparing lever has been released (i.e., the work preparing switch 86 has been turned off) and a third condition that the work starting button has been depressed again (i.e., the work starting switch 74 has been turned off.

Step ST11: Control reverts to step ST02 after setting the target motor rotation speed SO to the low speed Ln, namely, back to the initial setting.

Step ST12: Determination is made as to whether the housing/cleaning box 111 has been appropriately attached to the fender 14. With a YES determination, control proceeds to step ST13, while, with a NO determination, control proceeds to step ST18. If the detection section 117 is in the ON state, i.e. if the cover-side terminals 119 are in the conducting state, it is determined that the housing/cleaning box 111 has been appropriately attached to the fender 14.

Step ST13: Determination is made as to whether the cleaning switch 22 has been turned on. With a YES determination, control proceeds to step ST14, while, with a NO determination, control proceeds to step ST18.

Step ST14: If the three conditions have been satisfied at steps ST02, ST12 and ST13, the electric motor 11 is activated or caused to rotate. Namely, the electric motor 11 is caused to rotate, only upon satisfaction of the first condition that the operating handle 18 has been taken out of the handle support 51, the second condition that the housing/cleaning box 111 has been appropriately attached to the fender 14 and the third condition that the cleaning switch 22 has been turned on.

Step ST15: The target motor rotation speed SO is set to a cleaning rotation speed Wn that corresponds to a given number of rotations of the motor 11 suitable for washing the tilling claws etc. within the cleaning box 111.

Step ST16: Actual rotation speed SN of the motor 11 is measured, for example, by the rotation sensor 61 measuring an actual number of rotations of the motor 11.

Step ST17: Control reverts to step ST02 after controlling the motor 11 in accordance with the currently-set target motor rotation speed SO. Namely, the motor 11 is controlled such that the actual rotation speed SN equals the currently-set target motor rotation speed SO. The target motor rotation speed SO is provided as a PI (Proportional and Integral) control signal in the case of the PI control, but as a PID (Proportional, Integral and Differential) control signal in the case of the PID control. Alternatively, such a control signal may be a PWM (Pulse With Modulation) signal.

Step ST18: The motor 11 is deactivated upon satisfaction of any one of a first condition that the cleaning box 111 has been detached from the fender 14 and a second condition that the cleaning switch 22 has been turned off.

Step ST19: Control reverts to step ST02 after setting the target motor rotation speed SO to the low speed Ln, namely, back to the initial setting.

Note that, in case the operating handle section 18 has been set in the handle support 51 during the cleaning, the electric motor 11 is deactivated by sequentially taking step ST02, step ST103 and then step ST10.

Then, control proceeds to step S11 to set the target motor rotation speed SO to the low speed Ln, and reverts to step ST102.

The following paragraphs describe in more detail the operations of step ST02 and steps ST12–ST17.

Figure 14A:
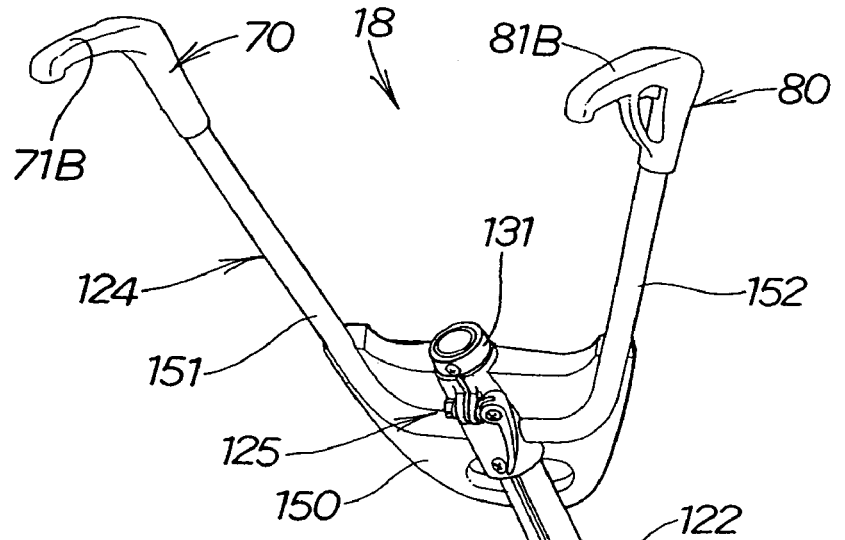
FIGS. 14A and 14B are first views explanatory of the behavior of the electric tilling machine of the invention.
Figure 14B:
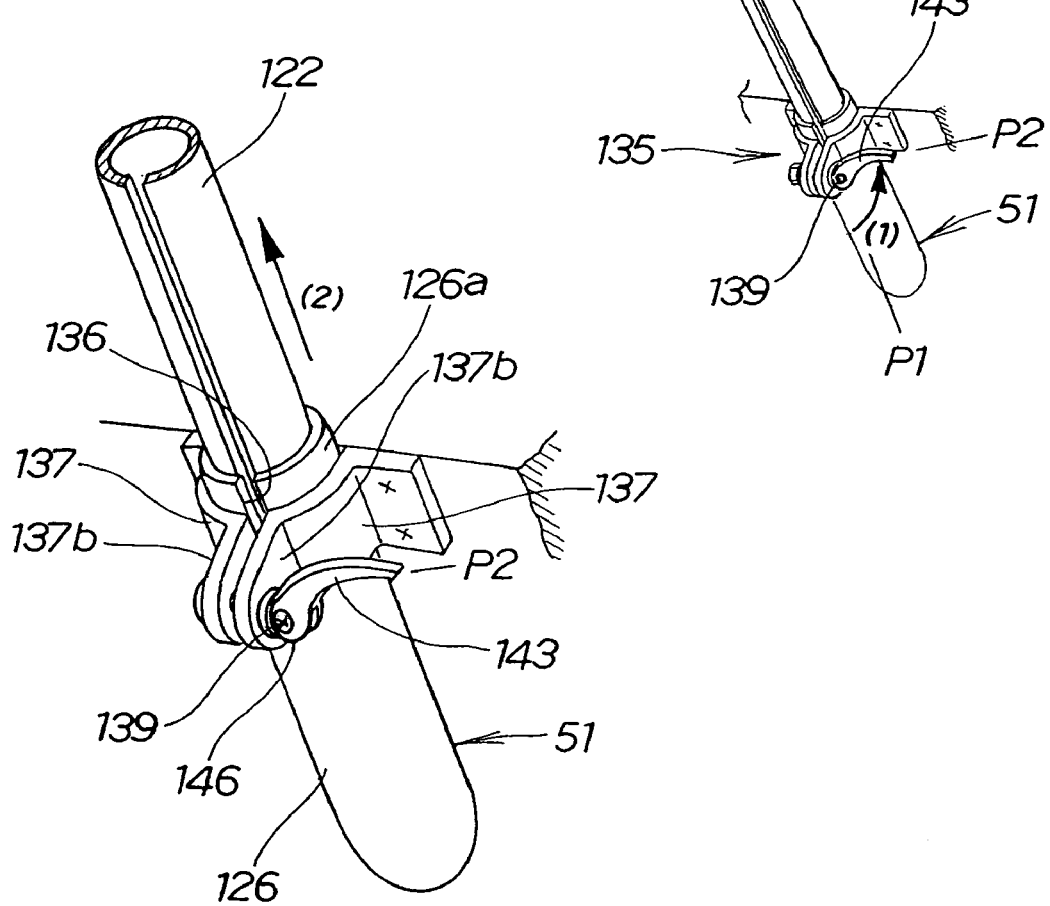

FIGS. 14A and 14B are first views explanatory of the behavior of the electric tilling machine 10. In FIG. 14A, the lever portion 143 of the locking mechanism 135 is caused to pivot about the bolt 139 from the locking position P1 to the unlocking position P2 as depicted by arrow 1.

In FIG. 14B, the lever portion 143 is shifted to the unlocking position P2 to thereby increase the distance between the opposed projections 137b and hence the width of the slit 136 in the supporting pipe 126. Thus, the inner diameter of the supporting pipe 126 is increased to weaken the fastening force applied to the handle post 122 by the supporting pipe 126, so that the handle post 122 is released from the locking by the pipe 126. Then, the handle post 122 is pulled out of the supporting pipe 126 as depicted by arrow 2.

Figure 15:
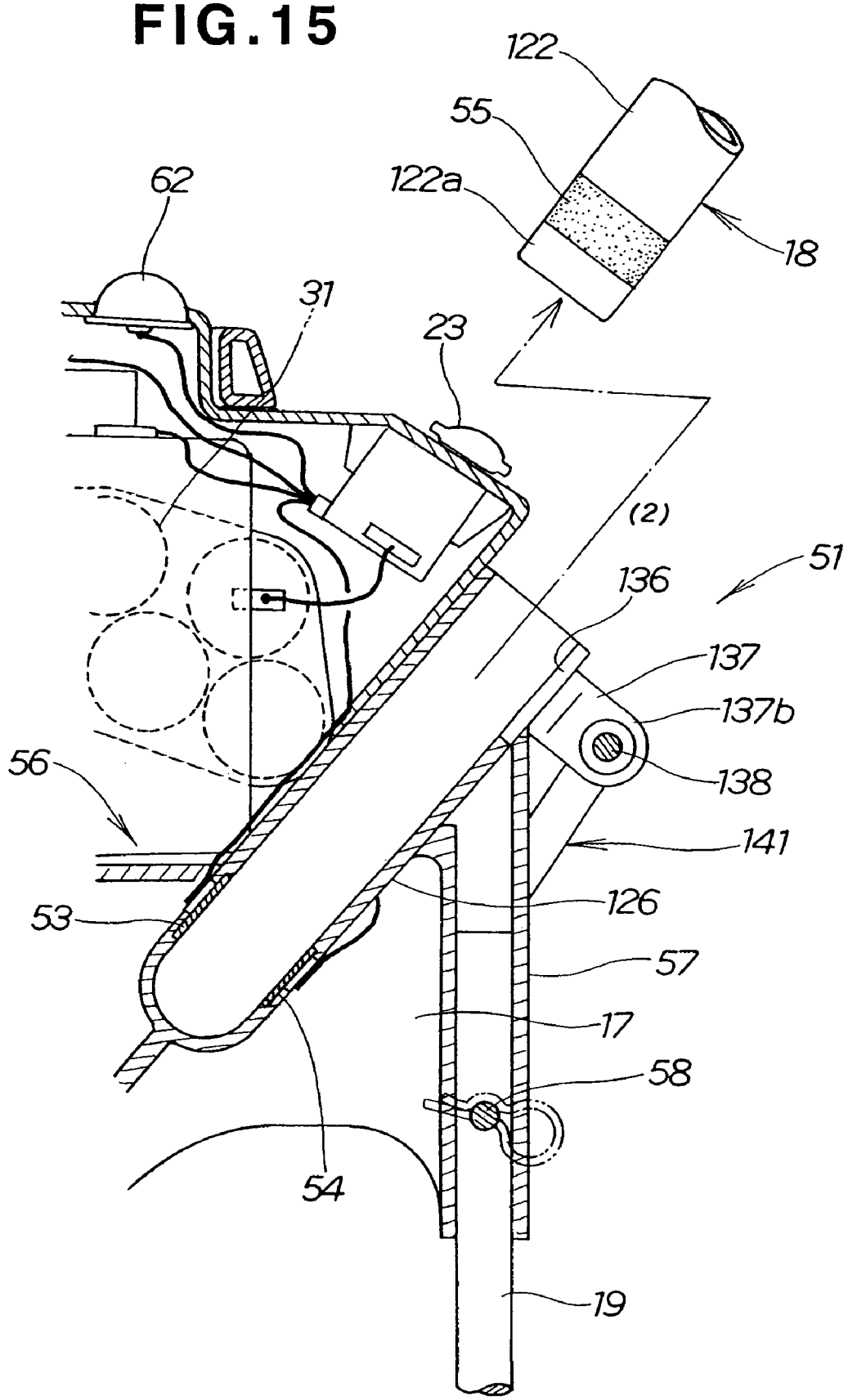
FIG. 15 is a second view explanatory of the behavior of the electric tilling machine of the invention.

FIG. 15 is a second view explanatory of the behavior of the electric cultivator 10, which particularly shows details of step ST02.

By pulling the proximal end portion 122a of the handle post 122 from the supporting pipe 126, the handle-side terminal 55 of the proximal end portion 122a is disconnected from the body-side terminals 53 and 54 within the supporting pipe 126. Namely, the handle attachment switch 56, composed of the handle-side terminal 55 and body-side terminals 53 and 54, is brought to an electrically-disconnected or OFF state.

With the handle attachment switch 56 thus electrically disconnected, the control section 102 (see FIG. 5) can control the tilling claws (tilling unit) 13 to not work even when any of the operating buttons 72, 73 and 83 and work preparing lever 82 has been operated. This arrangement can eliminate a need for the human operator to turn off the main switch when the handle post 122 has been detached from the supporting pipe 126.

Figure 16A:
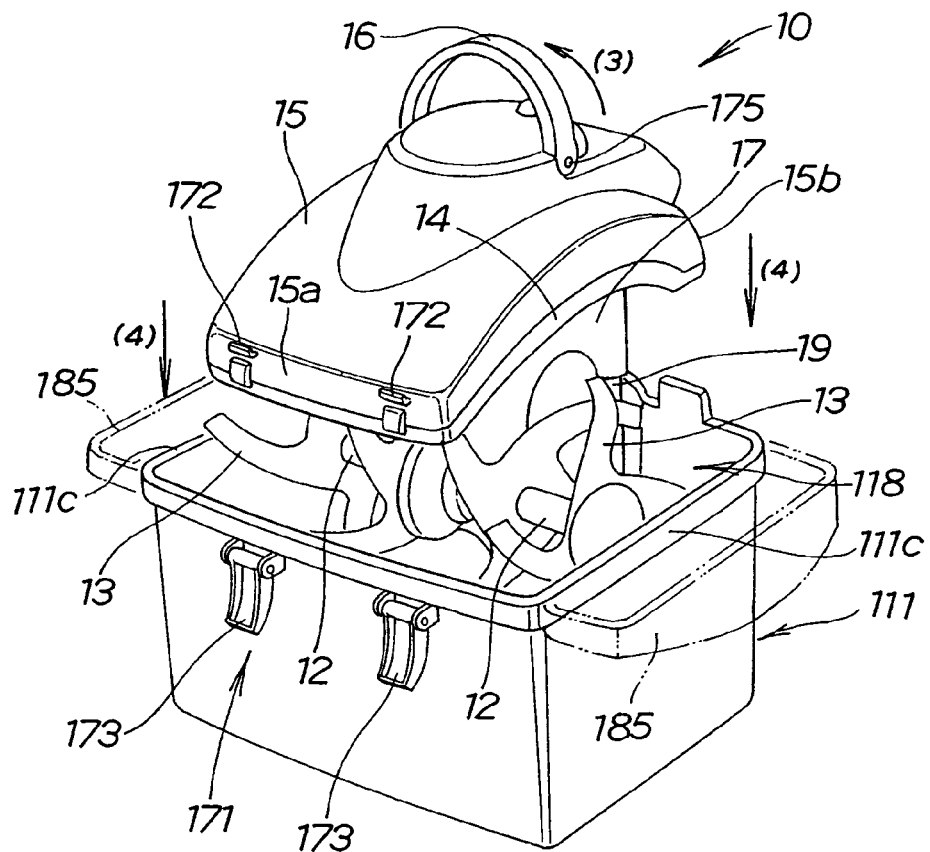
FIGS. 16A and 16B are third views explanatory of the behavior of the electric tilling machine of the invention.
Figure 16B:
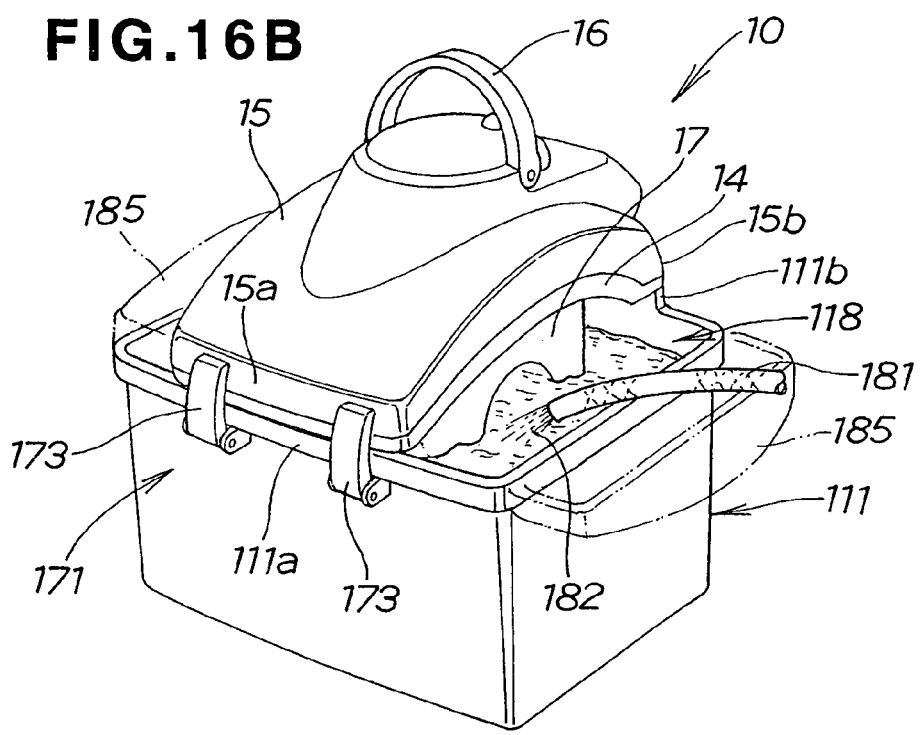

FIGS. 16A and 16B are third views explanatory of the behavior of the tilling machine 10, which particularly shows details of step S12.

In FIG. 16A, the side covers 185 provided on the opposite sides 111c of the housing/cleaning box 111 are brought into the closed position to the open position. Then, the carrying handle 16 on the top of the machine body 17 is caused to pivot upwardly from the position of FIG. 1 about the pin 175, as depicted by arrow 3.

The components located under the fender 14, such as the tilling shaft 12, tilling claws 13 and resisting bar 19, are housed in the housing/cleaning box 111 through the opening 118 with the carrying handle 16 held by a hand of the human operator, as depicted by arrow 4. During that time, the resisting bar 19 is held in its non-tilling (rest) position (see also FIGS. 10 and 12) horizontally inverted from its tilling (use) position of FIG. 2.

Then, as shown inn FIG. 16B, the front portion 15a of the upper cover 15 is placed on the front portion 111a of the box 111, and the rear portion 15b of the upper cover 15 is placed on the rear portion 111b of the box 111, Then, the machine body 17 is locked to the housing/cleaning box 111 by means of the front and rear locking structures 171 and 112. Then, after closing one of the side covers 185, water 182 is supplied via a hose 181 into the housing/cleaning box 111 through a portion of the opening 118 adjacent the other (opened) side cover 185. After a predetermined amount of the water 182 has been supplied into the box 111, the other side cover 185 is closed.

Figure 17A:
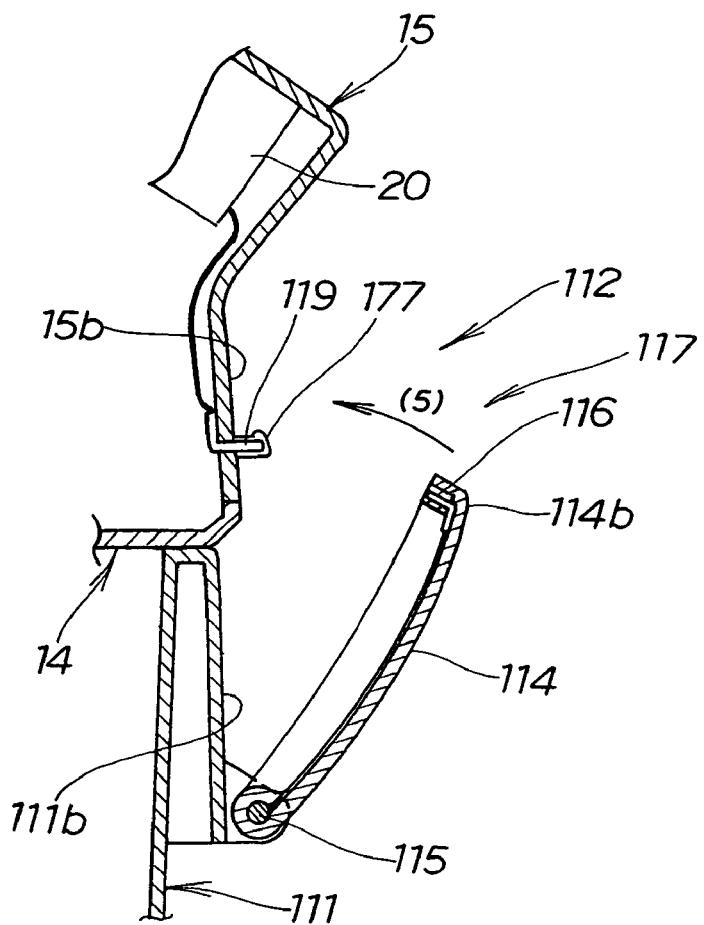
FIGS. 17A and 17B are fourth views explanatory of the behavior of the electric tilling machine of the invention.
Figure 17B:
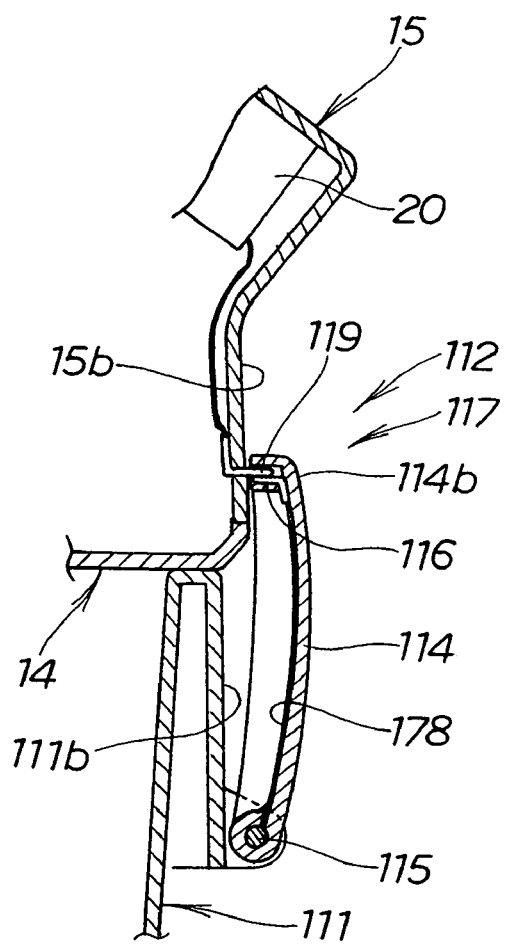

FIGS. 17A and 17B are fourth views explanatory of the behavior of the electric cultivator 10, which particularly shows details of step ST12.

The following paragraphs detail an operation sequence for locking together the rear portions 111b and 15b of the housing/cleaning box 111 and upper cover 15 by means of the rear locking structure 112.

In FIG. 17A, one of the engaging sections 114 of the rear locking structure 112 is caused to pivot about the conductive hinge pin 115 as depicted by arrow 5. Then, the distal portion 114b of the engaging section 114 is moved closer to the left and right locking projections 177 (only one of which is shown) and cover-side terminal 119.

Thus, as illustrated in FIG. 17B, the distal portion 114b of the rear engaging section 114 is brought into engagement with the left and right locking projections 177, and the locking-side terminal 116 of the locking structure 117 is brought into electrical engagement with the cover-side terminal 119, of the locking structure 117. Consequently, the cover-side terminal 119 is electrically connected with the hinge pin 115 via the locking-side terminal 116 and conductor section 178.

Namely, as set forth above in relation to FIG. 5, the two locking-side terminals 116 are electrically connected with the cover-side terminals 119, and the cover-side terminals 119 are electrically connected with each other via the locking-side terminals 116 and hinge pin 115.

Consequently, the locking structure 117 is brought to the conducting or ON state, which is detected by the control section 102 (see FIG. 5). This way, the control section 102 detects that the machine body 17 has been appropriately attached to the housing/cleaning box 111. The control section 102 keeps the electric motor 11 in a controllably operable condition in the cleaning mode. Therefore, the cleaning (mainly, washing) of the machine body 17, tilling shaft 12, tilling claws 13, resisting bar 19, etc. within the cleaning box 111 can be executed only when the machine body 17 has been appropriately attached to the box 111. This arrangement can eliminate a need for the human operator to check on the locking states of the front and rear locking structures 171 and 112 at the time of the cleaning.

Figure 18:
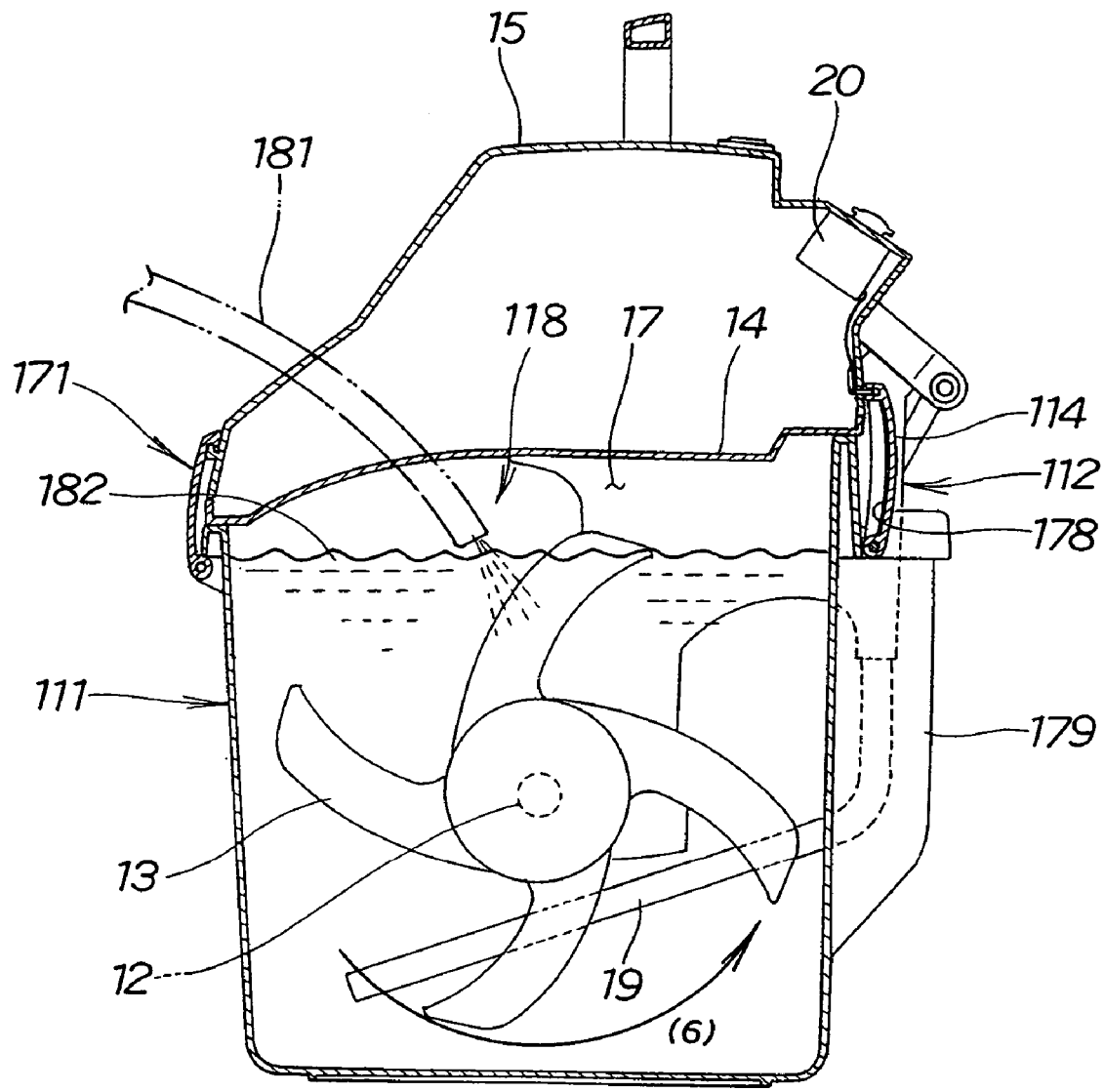
FIG. 18 is a fifth view explanatory of the behavior of the electric tilling machine of the invention.
Figure 19:
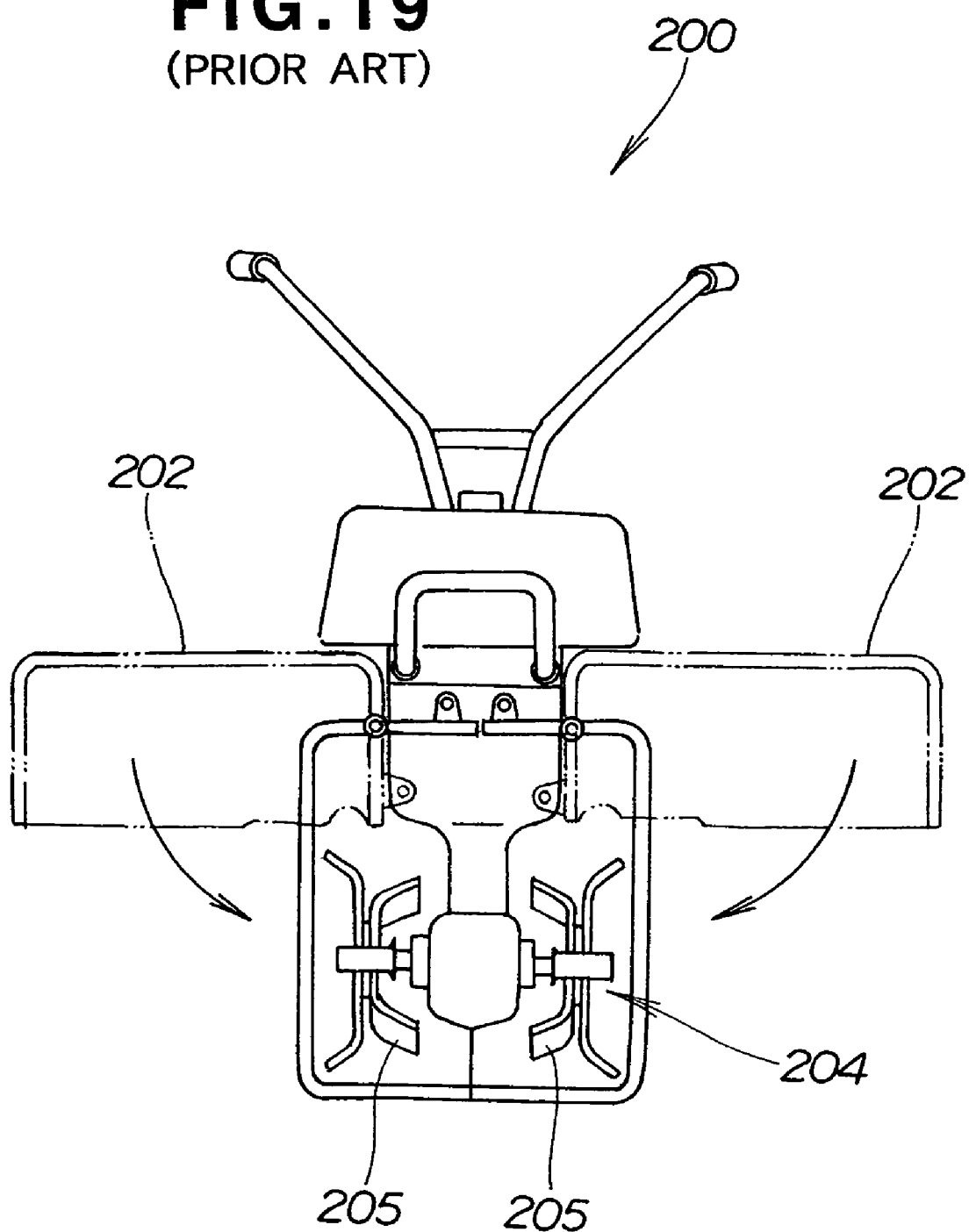
FIG. 19 is a front view of the conventional walk-behind tilling machine.

FIG. 18 is a fifth view explanatory of the behavior of the electric cultivator 10, which particularly shows details of steps ST13–ST17.

By turning on the cleaning switch 22 (FIG. 3), the electric motor 11 is rotated to turn the tilling shaft 12 and tilling claws 3 as depicted by arrow 6. At that time, an actual rotation speed SN of the motor 11 is measured, and the number of rotations of the motor 11 is controlled so that the actual rotation speed SN equals a currently-set target motor rotation speed SO.

By thus rotating the motor 11, the machine body 17 as the transmission case, tilling shaft 12, tilling claws 13, resisting bar 19, etc. can be washed with the water 182 supplied through the hose 181 into the housing/cleaning box 111. As a consequence, the human operator can clean the machine body 17, tilling shaft 12, tilling claws 13, resisting bar 19, etc. without much time and labor and without getting his or her hand (hands) dirty.

In an alternative, the target motor rotation speed SO may be set to vary randomly, instead of being set to a predetermined number of rotations.

At the time of cleaning of the machine body 17, tilling shaft 12, tilling claws 13, resisting bar 19, etc., the two side covers 185 are closed, so that the side covers 185 and fender 14, closing the opening 118 of the housing/cleaning box 111, can prevent scattering, through the opening 118, of the water 182 in the box 111.

In addition, the front and rear locking structures 171 and 112 can reliably lock the machine body 17 to the housing/ cleaning box 111 so that the box 111 can be prevented from being accidentally detached from the machine body 17; thus, the cleaning operations can be performed with an increased ease.

Whereas the preferred embodiment has been described above as employing the cleaning switch 22 that is kept in the ON (activated) state only while it is being depressed and turned off once it is released from the depression, the cleaning switch 22 may be a toggle switch that is turned on by one depression and turned off by another depression in the ON state. In this case, the electric motor 11 activated to rotate in response to turning-on of the cleaning switch 22 may be automatically deactivated upon lapse of a predetermined time, e.g. five minutes, counted by a timer (not shown).

Further, the motor 11 is kept in the state controllably operable under the control of the control section 102 on condition that the control section 102 has detected that the locking-side terminals 116 have been electrically connected with the cover-side terminals 119 with the machine body 17 locked to the box 111 via the front and rear locking structures 171 and 112. Therefore, the cleaning of the machine body 17, tilling shaft 12, tilling claws 13, resisting bar 19, etc. within the cleaning box 111 is permitted only when the machine body 17 has been appropriately attached to the box 111 via the locking structures 171 and 112. This arrangement can eliminate a need for the human operator to check on the locking states of the front and rear locking structures 171 and 112 at the time of the cleaning.

Further, the front locking structure 171 for attaching the upper cover 15 and fender 14 to the housing/cleaning box 111 has been described above as including the pair of front locking projection sections 172 provided on the front portion 15a of the upper cover 15, and the rear locking structure 112 has been described above as including the pair of rear locking projection sections 113 provided on the rear portion 15b of the upper cover 15. However, the present invention is not so limited; for example, the pair of front locking projection sections 172 may be provided on a front portion of the fender 14, and the pair of rear locking projection sections 113 may be provided on a rear portion of the fender 14.

In summary, the electric tilling machine of the invention arranged in the above-described manner can reliably prevent clothes of the human operator from getting soiled by contacting the tilling shaft and claws during transport or storage of the machine and which also allows the tilling shaft and claws to be readily cleaned without requiring much time and labor.

Obviously, various minor changes and modifications of the present invention are possible in the light of the above teaching. It is therefore to be understood that within the scope of the appended claims the invention may be practiced otherwise than as specifically described.

What is claimed is:

1. An electric tilling machine comprising:
a machine body;
an electric motor provided on the machine body;
a tilling shaft disposed beneath the machine body and connected to be rotationally driven by the motor, the tilling shaft having one or more tilling claws for tilling earth in response to rotation of the tilling shaft by the motor;
a housing/cleaning box adapted to house and clean the tilling shaft and the tilling claws therein, the housing/cleaning box having an opening closable by the machine body when the machine body is removably attached to the housing/cleaning box;
locking means for locking the machine body to the housing/cleaning box with the tilling shaft and the tilling claws housed in the housing/cleaning box;
detection means including a locking-side terminal provided on the locking means and a body-side terminal provided on the machine body, the locking-side terminal being electrically connected to the body-side terminal when the machine body is locked to the housing/cleaning box via the locking means; and
a control section for keeping the motor in a controllably operable condition while the locking-side terminal is electrically connected to the body-side terminal.

2. An electric tilling machine comprising a machine body; an electric motor mounted to the machine body; a tilling shaft connected to be rotationally driven by the electric motor and disposed beneath the machine body; one or more tilling claws connected to the tilling shaft for rotation therewith for tilling earth; a control section for controlling operation of the electric motor; an enclosure having an upper open end and being configured to receive therein the tilling shaft and the tilling claws when the machine body is removably positioned atop the upper open end of the enclosure; a locking structure for releasably locking the machine body to the enclosure when the machine body is removably positioned in a predetermined position atop the upper open end of the enclosure, the locking structure comprising first locking parts connected to the machine body, and second locking parts connected to the enclosure and releasably engageable with respective ones of the first locking parts to releasably lock the machine body to the enclosure; and
a detection section for detecting when the machine body is locked to the enclosure.

3. An electric tilling machine according to claim 2; wherein the detection section is electrically connected to the control section so that when the detection section detects that the machine body is locked to the enclosure, the control section places the electric motor in a controllably operable condition in readiness to be turned on by activation of a manually activatable switch.

4. An electric tilling machine according to claim 3; wherein the detection section includes terminals on one or more of the second locking parts of the locking structure engageable with terminals on the machine body when the machine body is locked to the enclosure.

5. An electric tilling machine comprising a machine body; an electric motor mounted to the machine body; a tilling shaft connected to be rotationally driven by the electric motor and disposed beneath the machine body; one or more tilling claws connected to the tilling shaft for rotation therewith for tilling earth; a control section for controlling operation of the electric motor; and an enclosure having an upper open end and being configured to receive therein the tilling shaft and the tilling claws when the machine body is removably positioned atop the upper open end of the enclosure, the enclosure having one or more side covers pivotally connected thereto for pivotal movement between a closed position wherein each side cover cooperates with the machine body to completely cover the upper open end of the enclosure when the machine body is positioned atop the enclosure and an open position wherein each side cover exposes the upper open end of the enclosure when the machine body is positioned atop the enclosure.

* * * * *